United States Patent [19]
Whitesage

[11] Patent Number: 5,191,523

[45] Date of Patent: Mar. 2, 1993

[54] SYSTEM FOR SYNTHESIZING TRAVEL COST INFORMATION

[75] Inventor: Michael D. Whitesage, Laurel, Md.

[73] Assignee: Prism Group, Inc., Laurel, Md.

[21] Appl. No.: 431,780

[22] Filed: Nov. 6, 1989

[51] Int. Cl.$^5$ .................. G06F 15/00; G06F 15/22
[52] U.S. Cl. ...................................... 364/407; 364/401
[58] Field of Search ........................... 364/407, 401

[56] References Cited

U.S. PATENT DOCUMENTS

| | | | |
|---|---|---|---|
| 3,622,995 | 11/1971 | Dilks et al. | 364/407 |
| 4,692,869 | 9/1987 | King et al. | 364/448 |
| 4,788,643 | 11/1988 | Trippe et al. | 364/407 |
| 4,845,625 | 7/1989 | Stannard | 364/407 |
| 4,922,439 | 5/1990 | Greenblatt | 364/407 |
| 5,021,953 | 6/1991 | Webber et al. | 364/407 |

FOREIGN PATENT DOCUMENTS 2386079 12/1978 France ................................ 364/407

OTHER PUBLICATIONS

"Agency, Funded by 3M, Set to Market Software" by Nadine Godwin; Travel Weekly; Oct. 13, 1986.

"Agency Dares to Launch Its Own Air Res. System" by Nadine Godwin, Travel Weekly.

Scharff Owner, Ed, "Trip 2.0", Sky Shepard Software, P.O. Box 49, St. Marys, Iowa 50241; Tel. (515) 255-3978.

Primary Examiner—Roy N. Envall, Jr.
Assistant Examiner—Xuong M. Chung
Attorney, Agent, or Firm—Wigman & Cohen

[57] ABSTRACT

The present invention is directed to method and apparatus forming a system for deriving from computer-based travel reservations systems specific cost and time information, on per-unit basis, such that accurate cost information may be produced for comparison purposes. Using a programmable computer under control of a program instruction set, individual data segments of a given trip between two points (origination-to-destination) is reduced to a common per-unit basis permitting uniform comparison and analysis. The process identifies each trip having an origination and destination by a unique name, determines the number of connecting segments flown, the number of miles flown, the amount of time from departure to arrival, and the costs on per-hour and per-mile basis.

56 Claims, 45 Drawing Sheets

PROGRAM OD

IMPLICIT NONE

* ODOLD VARIABLES - MANY USED DIRECTLY IN ODNEW

INTEGER          INVOICE, SEG, CUST, DEPART_HOUR, DEPART_MIN,
+                   ARRIV_HOUR, ARRIV_MIN

CHARACTER*1     SERV_CLASS, CONNECT_IND, INV_TYPE, DI,
+                   PURCH_CODE
    CHARACTER*2     ADS, CARRIER_CODE, VAL_CARRIER, BRANCH,
+                   PYMNT_FORM, CC_CODE
    CHARACTER*3     FROM_CITY, TO_CITY, DEPART_CITY, ARRIV_CITY
    CHARACTER*4     FLIGHT
    CHARACTER*6     PNR_LOCATOR
    CHARACTER*8     DEPART_DATE, ARRIV_DATE, INV_DATE
    CHARACTER*10    DOC
    CHARACTER*13    FARE_BASIS
    CHARACTER*15    FIRSTNAME
    CHARACTER*20    LASTNAME
    CHARACTER*23    CC
    CHARACTER*40    UDID_DATA

REAL             OD_FARE, TRX_AMT, COMP_FARE, SAVING_AMT,
+                   TAX_AMT, COMM_AMT

* ODNEW VARIABLES NOT IN ODOLD

INTEGER          LEVNO, ADV_PURCH, OD_HOURS, OD_MINS, OD_MILES,
+                   SEG_CTR

CHARACTER*3     ORG_CITY, CNX_CITY, DES_CITY
    CHARACTER*4     INV_YR
    CHARACTER*5     LEV(6), FARE_CODE
    CHARACTER*7     O_D
    CHARACTER*9     INV_MTH, DEPART_DAY, ARRIV_DAY
    CHARACTER*11    ROUTE
    CHARACTER*37    PASSENGER

FIG. 6AA

```
      CHARACTER*333    ODNEW

REAL             PENALTY_CODE, CPM

* OTHER LOCAL VARIABLES
      INTEGER          IDATE, DDATE, IERR, CITYERR, DEPART_TZ, ARRIV_TZ
     +                 RECNO, ODREC, MAXODS, OLD_INV, OD_NUM, OD_CTR,
     +                 SEG_MILES, OD_SEG_MILES

PARAMETER        (MAXODS = 20)

CHARACTER*1      DEPART_DST, ARRIV_DST, OD_DI
      CHARACTER*11     DATE, TIME
      CHARACTER*18     CINV_DATE
      CHARACTER*333    INVOD(MAXODS)

LOGICAL          VALID

REAL             DEPART_LONG, DEPART_LAT, ARRIV_LONG, ARRIV_LAT

* FUNCTIONS
      INTEGER          IIDATE, LASTCH, MAX
      CHARACTER*9      WKDAY
      CHARACTER*11     TODATE, TOTIME
      CHARACTER*18     CCDATE

*----------------------------------------------------------------
* OPEN ODOLD.DAT FOR READING, ODNEW.DAT FOR WRITING.
* AND OD.LOG FOR WRITING ERROR OR OTHER LOG MESSAGES.
*----------------------------------------------------------------

OPEN (60, FILE='ODOLD.DAT', STATUS='OLD',          ERR=900)
      OPEN (61, FILE='ODNEW.DAT', STATUS='NEW',          ERR=901,
     +      CARRIAGECONTROL='LIST', RECL=333)
      OPEN (66, FILE='OD.LOG',   STATUS='UNKNOWN', ERR=902)

DATE = TODATE(IERR)
      TIME = TOTIME(IERR)

WRITE (66,'(72("="))')
```

FIG. 6AB

FILE

RECNO = RECNO + 1
SEG_CTR = 1

```
    READ (60, 10, ERR=910, END=920)
   +ADS,              INVOICE,        SEG,            CUST,
   +PNR_LOCATOR,      FROM_CITY,      TO_CITY,        CARRIER_CODE,
   +FARE_BASIS,       FLIGHT,         SERV_CLASS,     DEPART_DATE,
   +DEPART_HOUR,      DEPART_MIN,     ARRIV_DATE,     ARRIV_HOUR,
   +ARRIV_MIN,        CONNECT_IND,    OD_FARE,        DEPART_CITY,
   +ARRIV_CITY,       SEG_MILES,      INV_TYPE,       INV_DATE,
   +BRANCH,           CC_CODE,        CC,             UDID_DATA,
   +DOC,              TRX_AMT,        VAL_CARRIER,    DI,
   +LASTNAME,         FIRSTNAME,      COMP_FARE,      PURCH_CODE,
   +SAVING_AMT,       PYMNT_FORM,     TAX_AMT,        COMM_AMT

10  FORMAT (A2,       I6,             I2,             I5,
   +        A6,       A3,             A3,             A2,
   +        A13,      A4,             A1,             A8,
   +        I2,       I2,             A8,             I2,
   +        I2,       A1,             F10.2,          A3,
   +        A3,       I6,             A1,             A8,
   +        A2,       A2,             A23,            A40,
   +        A10,      F10.2,          A2,             A1,
   +        A20,      A15,            F10.2,          A1,
   +        F10.2,    A2,             F9.2,           F9.2)

*   WRITE (*,*) 'OD_FARE = ', OD_FARE

WRITE (*,'(1X,A,I5,3A,I6,A,I2,A,I5)') 'OD - RECNO1 = ', RECNO,
   +      ', ADS# = ', ADS,
   +      ', INVOICE# = ', INVOICE, ', SEG# = ', SEG, ', CUST# = ', CUST
    WRITE (66,'(1X,A,I5,3A,I6,A,I2,A,I5)') 'OD - RECNO1 = ', RECNO,
   +      ', ADS# = ', ADS,
   +      ', INVOICE# = ', INVOICE, ', SEG# = ', SEG, ', CUST# = ', CUST
```

*---- THIS IS THE FIRST RECORD IN AN OD SET, FROM AND DEPART CITIES MUST BE =.

FIG. 6AC

```
        IF (FROM_CITY .NE. DEPART_CITY) THEN
           WRITE (66,*) 'OD - ERROR, FROM_CITY (', FROM_CITY,
      +              ') NE DEPART_CITY (', DEPART_CITY, ') FOR FIRST ',
      +              'OD RECORD # ', RECNO.
           GOTO 100
        END IF

*-----------------------------------------------------------------
*     CALCULATE THE ITEMS FROM THE FIRST SEGMENT OF THE OD RECORD
*     THAT GO INTO THE ODNEW RECORD.
*-----------------------------------------------------------------

*---- ONLY PUT THE INVOICE AMOUNTS ON THE FIRST OD RECORD OF THE INVOICE

IF (INVOICE .EQ. OLD_INV) THEN
*          THIS IS NOT THE FIRST OD IN AN INVOICE
           OD_NUM    = OD_NUM + 1
           IF (OD_NUM .GT. MAXODS) THEN
              WRITE (66,*) 'ERROR - TOO MANY ODS FOR THIS INVOICE. ',
      +                  'THE MAXIMUM ALLOWED IS:', MAXODS
              GOTO 999
           END IF
           TRX_AMT      = 0.0
           COMP_FARE    = 0.0
           TAX_AMT      = 0.0
           COMM_AMT     = 0.0
           SAVING_AMT   = 0.0
        ELSE
*          THIS IS THE FIRST RECORD OF AN INVOICE.

*          IF THIS IS THE VERY FIRST RECORD DON'T CALL FARECALC.
           IF (RECNO .NE. 1) THEN
*             CALCULATE THE OD FARES, COST PER MILE, AND WRITE OUT THE ODNEW
*             RECORDS FOR THE INVOICE JUST COMPLETED.
                 CALL FARECALC(INVOD,OD_NUM)
           END IF

OLD_INV   = INVOICE
           OD_NUM    = 1
```

FIG. 6AD

```
      END IF

*---- TRACK TOTAL SEGMENT MILES FOR INTERNATIONAL FLIGHTS BY
*       ADDING UP SEGMENT MILES FROM ADS. THIS IS THE FIRST
*       RECORD OF THE OD SO INITIALIZE THE VALUE.

OD_SEG_MILES = SEG_MILES

*---- CONVERT UDID_DATA TO LEVELS

CALL UDIDLEV(IERR, UDID_DATA, LEVNO, LEV)
*     IF ERR - IGNORE AND LEVELS WILL BE BLANK FROM SUBR

*---- DO DATE AND DAY CALCULATIONS

DDATE = IIDATE(IERR, DEPART_DATE, 1)
      IF (IERR .EQ. 0) THEN
*----    GET DEPART DAY FROM DEPART DATE
         DEPART_DAY = WKDAY(DDATE)

IDATE = IIDATE(IERR, INV_DATE, 1)

IF (IERR .EQ. 0) THEN
*----       CALCULATE NUMBER OF DAYS ADVANCE PURCHASE
            ADV_PURCH = DDATE - IDATE

*----       ENSURE A POSITIVE NUMBER THAT WILL FIT IN 3
*             CHARACTERS
            IF (ADV_PURCH .GT. 999) THEN
               ADV_PURCH = 999
            ELSE IF (ADV_PURCH .LT. 0) THEN
               ADV_PURCH = 0
            END IF

*----       GET CHARACTER INVOICE MONTH AND YEAR FROM INVOICE
*             DATE
*               (MONTH DD, YYYY)
            CINV_DATE  = CCDATE(IERR, IDATE, 4)
            INV_MTH    = CINV_DATE(1:INDEX(CINV_DATE,' '))
            INV_YR     = CINV_DATE(INDEX(CINV_DATE,',')+2:)
```

FIG. 6AE

```
        END IF
      END IF

*---- DETERMINE THE FARE CODE FROM FARE BASIS

CALL BAS2CODE(FARE_BASIS, FARE_CODE)

*---- ORIGINATION CITY IS THE DEPART CITY FROM THIS FIRST
*       RECORD OF AN OD

ORG_CITY = DEPART_CITY

*---- CONNECTION CITY MAY BE THE TO CITY OF THIS RECORD (IF
*       THERE ARE NO CONNECTIONS IT WILL BE BLANKED OUT. IF
*       THERE IS MORE THAN 1 CONNECTION THEN IT WILL BE '*')

CNX_CITY = TO_CITY

PASSENGER = LASTNAME(1:LASTCH(LASTNAME)) // ', ' //    FIRSTNAME

*------------------------------------------------------------
* WRITE ALL THE INFORMATION FROM THIS FIRST OD RECORD TO
* THE ODNEW RECORD. IF THE DATA IS NOT FROM THIS FIRST OD
* RECORD, USE BLANKS OR 0 OR 0.0. THE ACTUAL VALUES WILL BE
* INPUT LATER WHEN THE DESTINATION RECORD IS FOUND.
*------------------------------------------------------------

WRITE (ODNEW, 101, ERR=930)
     +    ADS,          CUST,         LEVNO,          LEV,
     +    INVOICE,      INV_TYPE,     INV_DATE,       ADV_PURCH,
     +    INV_MTH,      INV_YR,       PNR_LOCATOR,    DOC,
     +    DI,           VAL_CARRIER,  CARRIER_CODE,   FARE_BASIS,
     +    FARE_CODE,    PENALTY_CODE, FLIGHT,         SERV_CLASS,
     +    DEPART_DATE,  DEPART_DAY,   DEPART_HOUR,    DEPART_MIN,
     +    ARRIV_DATE,   ARRIV_DAY,    ARRIV_HOUR,     ARRIV_MIN,
     +    OD_HOURS,     OD_MINS,      CONNECT_IND,    ORG_CITY,
     +    CNX_CITY,     DES_CITY,     ROUTE,          O_D,
     +    OD_MILES,     OD_FARE,      CPM,            TRX_AMT,
```

FIG. 6AF

```
     +      COMP_FARE,   SAVING_AMT,   SEG_CTR,      PURCH_CODE,' ',
     +      PASSENGER,   SEG,          BRANCH,       PYMNT_FORM,
     +      CC_CODE,     CC,           TAX_AMT,      COMM_AMT,

101  FORMAT (A2,         I5,           I1,           6(A5),
     +       I6,         A1,           A8,           I3,
     +       A9,         A4,           A6,           A10,
     +       A1,         A2,           A2,           A13,
     +       A5,         F5.3,         A4,           A1,
     +       A8,         A9,           I2,           I2,
     +       A8,         A9,           I2,           I2,
     +       I2,         I2,           A1,           A3,
     +       A3,         A3,           A11,          A7,
     +       I5,         F10.2,        F6.2,         F10.2,
     +       F10.2,      F10.2,        I2,           A2
     +       A37,        I2,           A2,           A2,
     +       A2,         A23,          F9.2,         F9.2)

ODREC = ODREC + 1

*-----------------------------------------------------
* IF TO_CITY IS NOT = ARRIV_CITY THEN THIS DOES NOT COMPLETE AN OD
* RECORD.
*-----------------------------------------------------

200  CONTINUE

IF (TO_CITY .NE. ARRIV_CITY) THEN
        SEG_CTR = SEG_CTR + 1

*---- GET THE NEXT RECORD FROM ODOLD

RECNO = RECNO + 1

READ (60, 10, ERR=910, END=920)
     +      ADS,          INVOICE      SEG,         CUST,
     +      PNR_LOCATOR,  FROM_CITY,   TO_CITY,     CARRIER_CODE,
     +      FARE_BASIS,   FLIGHT,      SERV_CLASS,  DEPART_DATE,
     +      DEPART_HOUR,  DEPART_MIN,  ARRIV_DATE,  ARRIV_HOUR,
     +      ARRIV_MIN,    CONNECT_IND, OD_FARE,     DEPART_CITY,
```

FIG. 6AG

WRITE (66,*) 'OD - ENTERED ON ', DATE, ' AT ', TIME

```
RECNO      = 0
ODREC      = 0
OLD_INV    = ' '
OD_NUM     = 0
```

*_____
* LOOP THROUGH THE SEGMENT RECORDS
*_____

100  CONTINUE

*---- INITIALIZE VARIABLES NOT READ FROM ODOLD THAT WILL BE GOING INTO
*      ODNEW

```
ADV_PURCH      = 0
OD_HOURS       = 0
OD_MINS        = 0
OD_MILES       = 0
OD_CTR         = 0

ORG_CITY       = ' '
CNX_CITY       = ' '
DES_CITY       = ' '
INV_YR         = ' '
FARE_CODE      = ' '
O_D            = ' '
INV_MTH        = ' '
DEPART_DAY     = ' '
ARRIV_DAY      = ' '
ROUTE          = ' '

PENALTY_CODE   = 0.0
CPM            = 0.0

ODNEW          = ' '
OD_DI          = ' '
```

*---- A NEW OD RECORD - START SEGMENT COUNTER AT 1, READ THE ODOLD

FIG. 6AH

```
     +      ARRIV_CITY,      SEG_MILES,      INV_TYPE, INV_DATE,
     +      BRANCH,           CC_CODE,        CC,       UDID_DATA,
     +      DOC,              TRX_AMT,        VAL_CARRIER, DI,
     +      LASTNAME,         FIRSTNAME,      COMP_FARE, PURCH_CODE,
     +      SAVING_AMT,       PYMNT_FORM,     TAX_AMT,   COMM_AMT

WRITE (*,*) 'OD_FARE = ', OD_FARE

WRITE (*,'(1X,A,I5,3A,I6,A,I2,A,I5)') 'OD - RECNO2 = ', RECNO,
     +   ', ADS# = ', ADS,
     +   ', INVOICE# = ', INVOICE, ', SEG# = ', SEG, ', CUST# = ', CUST
          WRITE (66,'(1X,A,I5,3A,I6,A,I2,A,I5)') 'OD - RECNO2 = ', RECNO,
     +   ', ADS# = ', ADS,
     +   ', INVOICE# = ', INVOICE, ', SEG# = ', SEG, ', CUST# = ', CUST

*----    IF ANY SEGMENT IN AN OD IS INTERNATIONAL, THE ENTIRE OD IS
*        INTERNATIONAL

IF (DI .EQ. 'I') THEN
           OD_DI = 'I'
        END IF

OD_SEG_MILES = OD_SEG_MILES + SEG_MILES

GO TO 200

END IF

*-----------------------------------------------------------
*    WE NOW HAVE THE DESTINATION RECORD.  CALCULATE THE ODNEW ITEMS
*    STILL REMAINING AND WRITE (OVERWRITE) THE LATEST INFO INTO
*    ODNEW.
*-----------------------------------------------------------

IDATE = IIDATE(IERR, ARRIV_DATE, 1)
        IF (IERR .EQ. 0) THEN
*----     GET ARRIVE DAY FROM ARRIVE DATE
           ARRIV_DAY = WKDAY(IDATE)
        END IF
```

FIG. 6AI

```
*---- GET THE ORIGINATION CITY FROM THE ODNEW RECORD

ORG_CITY = ODNEW(166:168)

*---- THE CONNECTION CITY IS ' ' IF 1 SEGMENT, TO_CITY OF FIRST SEGMENT
*         IF 2 SEGMENTS, OR # OF CONNECTIONS IF >2 SEGMENTS.

CNX_CITY = ' '

IF (SEG_CTR .EQ. 2) THEN
       CNX_CITY = ODNEW(169:171)
    ELSE IF (SEG_CTR .GT. 2) THEN
       CALL ITOC(.TRUE., SEG_CTR - 1, CNX_CITY(1:2))
    END IF

*---- THE DESTINATION CITY IS THE LAST SEGMENT'S ARRIVE CITY.

DES_CITY = ARRIV_CITY

*---- ROUTE IS A CONCATENATION OF ORG,CNX,DES CITIES WITH A BLANK BETWEEN

ROUTE = ORG_CITY // ' ' // CNX_CITY // ' ' // DES_CITY

*---- O_D IS A CONCATENATION OF ORG,DES CITIES WITH A BLANK BETWEEN

O_D = ORG_CITY // ' ' // DES_CITY

*---- GET ORIGINATION AND DESTINATION CITY LOCATION AND TIME INFO

CALL CITYINFO (CITYERR, ORG_CITY, DEPART_LAT, DEPART_LONG,
      +              DEPART_TZ, DEPART_DST)
       IF (CITYERR .EQ. 0) THEN
          CALL CITYINFO (CITYERR, DES_CITY, ARRIV_LAT, ARRIV_LONG,
      +                 ARRIV_TZ, ARRIV_DST)
          IF (CITYERR .EQ. -1) THEN
             GOTO 999
          END IF
       ELSE IF (CITYERR .EQ. -1) THEN
          GOTO 999
       END IF
```

FIG. 6AJ

```
*---- CALCULATE THE ELAPSED TIME FROM ORIGINATION DEPARTURE TO
*     DESTINATION ARRIVAL (NEED TO GET DEPART INFO FROM ODNEW
*     RECORD IN CASE OF MULTIPLE SEGMENTS)

DEPART_DATE = ODNEW(119:126)
      DEPART_HOUR = 0
      DEPART_MIN  = 0
      CALL CTOI (VALID, ODNEW(136:137), DEPART_HOUR)
      CALL CTOI (VALID, ODNEW(138:139), DEPART_MIN)

IF (CITYERR .EQ. 0) THEN
         CALL ELTIME (DEPART_DATE, DEPART_HOUR, DEPART_MIN, DEPART_TZ,
     +        DEPART_DST, ARRIV_DATE, ARRIV_HOUR, ARRIV_MIN,
     +        ARRIV_TZ, ARRIV_DST, OD_HOURS, OD_MINS, IERR)

*---- CALCULATE THE DISTANCE IN MILES BETWEEN THE 2 CITIES
         CALL GREATC (DEPART_LAT, DEPART_LONG, ARRIV_LAT, ARRIV_LONG,
     +        OD_MILES)

END IF

*---- IF THE OD MILES ARE STILL 0 (COULDN'T FIND A CITY PERHAPS),
*     OR THE OD IS INTERNATIONAL (GREATC DOESN'T WORK GOOD FOR SOME
*     COMBINATIONS OF HEMISPHERES), USE THE TOTAL OF THE SEGMENT MILES
*     FROM ADS.

IF ((OD_MILES .EQ. 0) .OR. (OD_DI .EQ. 'I')) THEN
         OD_MILES = MAX(1, OD_SEG_MILES)
      END IF

*----------------------------------------------------------------
*     SET ALL THESE NEW VALUES INTO ODNEW
*----------------------------------------------------------------

IF (OD_DI .EQ. 'I') THEN
         ODNEW( 86: 88) = 'I'
      END IF

ODNEW(140:147) = ARRIV_DATE
```

FIG. 6AK

```
                                    ODNEW(148:156) = ARRIV_DAY
                                    ODNEW(157:164) = ' '
      CALL ITOC (.TRUE., ARRIV_HOUR, ODNEW(157:158))
      CALL ITOC (.TRUE., ARRIV_MIN,  ODNEW(159:160))
      CALL ITOC (.TRUE., OD_HOURS,   ODNEW(161:162))
      CALL ITOC (.TRUE., OD_MINS,    ODNEW(163:164))
                                    ODNEW(166:168) = ORG_CITY
                                    ODNEW(169:171) = CNX_CITY
                                    ODNEW(172:174) = DES_CITY
                                    ODNEW(175:185) = ROUTE
                                    ODNEW(186:192) = O_D
                                    ODNEW(193:207) = ' '
      CALL ITOC (.TRUE., OD_MILES,   ODNEW(193:197))
*-- TACK ON SALES TAX FOR OD_FARE
      CALL DTOC (8, DBLE(OD_FARE*1.08), ODNEW(198:207))
      CALL ITOC (.TRUE., SEG_CTR,    ODNEW(244:245))

*---- SAVE THIS ODNEW RECORD IN AN ARRAY SO FARECALC CAN REFINE THE

*     OD FARES AND COST PER MILE BEFORE WRITING THE RECORDS TO
*     ODNEW.DAT
      INVOD(OD_NUM) = ODNEW

*------------------------------------------------------------
*     GO GET THE NEXT RECORD
*------------------------------------------------------------

GOTO 100

*============================================================
*                EXIT PROGRAM
*============================================================

900   CONTINUE
      WRITE (*,*) 'ERROR OPENING ODOLD.DAT'
      GOTO 1000

901   CONTINUE
      WRITE(*,*) 'ERROR OPENING ODNEW.DAT'
```

FIG. 6AL

```
         CLOSE (60)
         GOTO 1000

902   CONTINUE
         WRITE (*,*) 'ERROR OPENING OD.LOG'
         CLOSE (60)
         CLOSE (61)
         GOTO 1000

910   CONTINUE
         WRITE (66,*) 'OD - ERROR DURING READ OF RECORD ', RECNO
         GOTO 999

920   CONTINUE
   *---- CALCULATE THE OD FARES, COST PER MILE, AND WRITE OUT THE
   *     ODNEW RECORDS FOR THIS INVOICE JUST COMPLETED.
         CALL FARECALC(INVOD,OD_NUM)

WRITE (66,*) 'OD - NORMAL END OF FILE ODOLD.DAT'
         GOTO 999

930   CONTINUE
         WRITE (66,*) 'OD - ERROR DURING WRITE TO ODNEW RECORD'
         GOTO 999

999   CONTINUE

WRITE (66,*) 'OD - NUMBER OF ODOLD RECORDS PROCESSED = ', RECNO
         WRITE (66,*) 'OD - NUMBER OF ODNEW RECORDS WRITTEN   = ', ODREC

CLOSE (60)
         CLOSE (61)
         CLOSE (66)

1000   CONTINUE
         END

SUBROUTINE GREATC(O_LAT, O_LONG, D_LAT, D_LONG, MILES)

IMPLICIT NONE
```

FIG. 6AM

```
*---- INPUT PARAMETERS
    REAL*4      O_LAT,      ! ORIGINATION CITY DECIMAL LATITUDE
    +           O_LONG,     ! ORIGINATION CITY DECIMAL LONGITUDE
    +           D_LAT,      ! DESTINATION CITY DECIMAL LATITUDE
    +           D_LONG      ! DESTINATION CITY DECIMAL LONGITUDE

*---- OUTPUT PARAMETERS
    INTEGER     MILES       ! STATUTE MILES BETWEEN THE 2 CITIES

*---- LOCAL VARIABLES
    REAL*4      STEP(25), FACTOR, MILEFACTOR

PARAMETER   (FACTOR = 57.2985)
    PARAMETER   (MILEFACTOR = 69.05 * 2.0 * FACTOR)

*------------------------------------------------------------

STEP(1)  = ABS(O_LONG - D_LONG)
    STEP(2)  = D_LAT + O_LAT
    STEP(3)  = D_LAT - O_LAT
    STEP(4)  = 0.5 * STEP(1)
    STEP(5)  = 0.5 * STEP(2)
    STEP(6)  = 0.5 * STEP(3)
    STEP(7)  = 1 / TAN(STEP(4) / FACTOR)
    STEP(8)  = SIN(STEP(6) / FACTOR)
    STEP(9)  = COS(STEP(5) / FACTOR)
    STEP(10) = COS(STEP(6) / FACTOR)
    STEP(11) = SIN(STEP(5) / FACTOR)

STEP(12) = (STEP(7) * STEP(8)) / STEP(9)
    STEP(13) = (STEP(7) * STEP(10)) / STEP(11)
    STEP(14) = FACTOR * ATAN(STEP(12))
    STEP(15) = FACTOR * ATAN(STEP(13))
    STEP(16) = STEP(15) + STEP(14)
    STEP(17) = STEP(15) - STEP(14)
    STEP(18) = TAN(0.5*((D_LAT/FACTOR)-(O_LAT/FACTOR)))
    STEP(19) = SIN(0.5*((STEP(16)/FACTOR)+(STEP(17)/FACTOR)))
    STEP(20) = SIN(0.5*((STEP(16)/FACTOR)-(STEP(17)/FACTOR)))
```

FIG. 6AN

```
STEP(21) = (STEP(18)*STEP(19))/STEP(20)
MILES    = IFIX(ABS((MILEFACTOR * ATAN(STEP(21)))

RETURN
END

SUBROUTINE FARECALC (INVOD, OD_NUM)

IMPLICIT NONE

* INPUT ARGUMENTS

CHARACTER*333 INVOD(*) ! ARRAY OF ODS FOR THIS INVOICE
   INTEGER       OD_NUM   ! NUMBER OF ODS IN THIS INVOICE

* LOCAL VARIABLES

INTEGER   MAXODS    ! MAXIMUM ODS ALLOWED
   PARAMETER (MAXODS = 20)

INTEGER   INV_MILES    ! TOTAL MILES FOR THE INVOICE
  +         ,ZERO_FARES   ! NUMBER OF ODS THAT HAVE OD_FARE = 0.0
  +         ,MISS_MILES   ! TOTAL MILES FOR ODS WITH MISSING FARE
  +         ,OD_MILES(MAXODS) ! OD_MILES FOR EACH OD RECORD
  +         ,MAX_FARE_NUM ! THE RECORD NUMBER OF THE LARGEST FARE
  +         ,I            ! COUNTER

DOUBLE PRECISION       ! (DOUBLE SO DTOC AND CTOD WORK)
  +         INV_AMT       ! TOTAL INVOICE FARE AMOUNT
  +        ,SUM_OD_FARE   ! TOTAL OF THE OD_FARES FOR THIS INVOICE
  +        ,MAX_OD_FARE   ! THE LARGEST OF THE OD_FARES IN THIS INVOICE
  +        ,OD_FARE(MAXODS) ! OD_FARE FOR EACH OD RECORD
  +        ,MISS_AMT      ! DIFF BETWEEN INVOICE AMT AND OD FARE TOTAL
  +        ,MISS_CPM      ! THE COST PER MILE OF ALL ODS WITH FARE = 0

LOGICAL   VALID

*--- INITIALIZE

INV_MILES = 0
```

FIG. 6A0

```
        ZERO_FARES = 0
        MISS_MILES = 0
        SUM_OD_FARE = 0.0
        MAX_OD_FARE = 0.0

*— GET THE TOTAL INVOICE AMOUNT FROM THE FIRST OD IN THE INVOICE
    CALL CTOD(VALID, INVOD(1)(214:223), INV_AMT)

*------------------------------------------------------------
* FLIP THROUGH THE ODS AND GET TOTALS, MAXIMUMS ETC.
*------------------------------------------------------------

DO 100, I = 1, OD_NUM
          CALL CTOI(VALID, INVOD(I)(193:197), OD_MILES(I))
          CALL CTOD(VALID, INVOD(I)(198:207), OD_FARE(I))

*—      GET THE MAXIMUM FARE AND WHICH RECORD IT IS FROM
          IF (OD_FARE(I) .GT. MAX_OD_FARE) THEN
            MAX_OD_FARE = OD_FARE(I)
            MAX_FARE_NUM = I
          END IF

INV_MILES   = INV_MILES + OD_MILES(I)
          SUM_OD_FARE = SUM_OD_FARE + OD_FARE(I)

IF (OD_FARE(I) .EQ. 0.0) THEN
            ZERO_FARES = ZERO_FARES + 1
            MISS_MILES = MISS_MILES + OD_MILES(I)
          END IF

100    CONTINUE

*------------------------------------------------------------
* PROCESS THE FARES SO THAT THE SUM OF THE FARES ALWAYS EQUALS THE
* TOTAL INVOICE AMOUNT.
*------------------------------------------------------------

IF (SUM_OD_FARE .NE. INV_AMT) THEN
*—      REDUCE THE MAXIMUM FARE SO THE SUM OF THE FARES = TOTAL FARE.
*       (THIS IS UNLIKELY TO HAPPEN WITH ANY ZERO OD FARES SO THIS
```

FIG. 6AP

```
*      SHOULD WORK OK IN VIRTUALLY ALL CASES)
       OD_FARE(MAX_FARE_NUM) = INV_AMT-(SUM_OD_FARE-MAX_OD_FARE)

ELSE IF (ZERO_FARES .EQ. 0) THEN
*---   ALL ODS HAVE FARE AMOUNTS, SEE IF THEY ADD UP TO THE TOTAL
*      INVOICE AMOUNT.  IF THEY DON'T, CHANGE THE BIGGEST OD FARE
*      SO THAT THEY WILL

IF (SUM_OD_FARE .NE. INV_AMT) THEN
              OD_FARE(MAX_FARE_NUM)=INV_AMT - (SUM_OD_FARE-MAX_OD_FARE)
          END IF

ELSE IF (ZERO_FARES .EQ. 1) THEN
*---   ONLY ONE FARE IS ZERO, FIND IT AND MAKE IT EQUAL TO THE
*      AMOUNT MISSING.

DO 200, I = 1, OD_NUM
             IF (OD_FARE(I) .EQ. 0.0) THEN
                OD_FARE(I) = INV_AMT - SUM_OD_FARE
             ENDIF
200       CONTINUE

ELSE
*---   SEVERAL ODS HAVE ZERO FARES.  FOR EACH ZERO FARE, USE THE TOTAL
*      COST PER MILE FOR THE MISSING FARE MILES TO CALCULATE THE
*      INDIVIDUAL OD FARE.

MISS_AMT = INV_AMT - SUM_OD_FARE
          MISS_CPM = MISS_AMT / MISS_MILES

DO 300, I = 1, OD_NUM
             IF (OD_FARE(I) .EQ. 0.0) THEN
                OD_FARE(I) = OD_MILES(I) * MISS_CPM
             END IF
300       CONTINUE

END IF

*------------------------------------------------------------
* WRITE THE NEWLY CALCULATED OF_FARES, CALCULATE EACH OD RECORD'S
```

FIG. 6AQ

```
* COST PER MILE AND WRITE THE RECORDS TO THE ODNEW.DAT FILE.
*----------------------------------------------------------------

DO 4, I = 1, OD_NUM
          CALL DTOC (8, OD_FARE(I), INVOD(I)(198:207)
          CALL DTOC (4, OD_FARE(I) / OD_MILES(I), INVOD(I)(208:213)
          WRITE (61,'(A333)') INVOD(I)
  400 CONTINUE

RETURN
      END

SUBROUTINE UDIDLEV(IERR, UDID, LEVNO, LEV)

IMPLICIT NONE
C.... PARAMETERS
      CHARACTER*40  UDID
      INTEGER       IERR, LEVNO
      CHARACTER*5   LEV(6)

C.... LOCAL VARIABLES
      CHARACTER*1   CH
      INTEGER       I, J

C.... INITIALIZE

DO 10 I = 1, 6
         LEV(I) = '    '
   10 CONTINUE

LEVNO = 1
      IERR  = 0

C.... GET ALL THE LEVEL NAMES. ALL NONBLANK CHARACTERS BETWEEN
C     COMMAS ARE USED.

J = 1
      DO 100 I = 1, 40
         CH = UDID(I:I)
         IF (CH .NE. ' ' .AND. CH .NE. ',') THEN
```

FIG. 6AR

```
C....    LEVELS MUST BE 5 OR LESS CHARACTERS (TRUNCATE IF NEEDED)
         IF (J .LE. 5) THEN
            LEV(LEVNO)(J:J) = CH
            J = J + 1
         END IF
      ELSE IF (CH .EQ. ',') THEN
         IF (LEVNO .LT. 6) THEN
            LEVNO = LEVNO + 1
            J = 1
         ELSE
            GOTO 999
         END IF
      END IF
100   CONTINUE

999   CONTINUE

C.... HANDLE TRAILING COMMA
      IF (LEV(LEVNO) .EQ. ' ') LEVNO = LEVNO - 1

RETURN
      END

SUBROUTINE BAS2CODE (BASIS, FCODE)

IMPLICIT NONE

*  INPUT ARGUMENTS
      CHARACTER*(*) BASIS

*  OUTPUT ARGUMENTS
      CHARACTER*(*) FCODE

*  LOCAL VARIABLES
      INTEGER    PTR, R, I
      LOGICAL    OK, FIRST

INTEGER    MAXRULES
      PARAMETER  (MAXRULES = 1000)
      CHARACTER*13 RULE(MAXRULES)
```

FIG. 6AS

```
      CHARACTER*5 CODE(MAXRULES)
      INTEGER   POS1(MAXRULES), POS2(MAXRULES), CLEN(MAXRULES),
     +          NUMRULES

DATA      FIRST / .TRUE. /

*----------------------------------------------------------------
* GET THE RULES THE FIRST TIME CALLED
*----------------------------------------------------------------

IF (FIRST) THEN
         FIRST = .FALSE.

OPEN (56, FILE='FCODE.RUL', STATUS='OLD', ERR=900)

NUMRULES = 1
50       CONTINUE
         READ (56, '(A13,1X,I1,1X,I1,1X,A5)', ERR=903, END=60)
     +         RULE(NUMRULES), POS1(NUMRULES), POS2(NUMRULES),
     +         CODE(NUMRULES)
C        PRINT *, 'TEST - NUM,RULE,POS1,POS2,CODE=', NUMRULES,
C    +   RULE(NUMRULES),POS1(NUMRULES),POS2(NUMRULES),CODE(NUMRULES)

CLEN(NUMRULES) = INDEX(RULE(NUMRULES),' ') - 1
         IF (CLEN(NUMRULES) .EQ. -1) CLEN(NUMRULES) = 13

*--      HANDLE '.' IN RULE AS FORCED BLANKS
         DO 55 I = 1, CLEN(NUMRULES)
            IF (RULE(NUMRULES)(I:I) .EQ. '.')
     +         RULE(NUMRULES)(I:I) = ' '
55       CONTINUE

NUMRULES = NUMRULES + 1
         IF (NUMRULES .GT. MAXRULES) THEN
            PRINT *, 'ERROR - TOO MANY RULES IN FCODE.RUL, MAX = ',
     +         MAXRULES
            GOTO 999
         END IF
         GOTO 50
```

FIG. 6AT

```
60      NUMRULES = NUMRULES - 1
C       PRINT *, 'NUMBER OF RULES = ', NUMRULES
C       PRINT *
C       PRINT *

END IF

*-----------------------------------------------------------------
* DETERMINE THE CODE
*-----------------------------------------------------------------

DO 100 R=1,NUMRULES

FCODE = 'DCAP'

PTR = INDEX(BASIS(POS1(R):),RULE(R)(1:CLEN(R)))

C         PRINT *, 'BAS2CODE - RULE, POS1, POS2, CODE=',RULE(R),POS1(R),
C       +          POS2(R),CODE(R)
C         PRINT *,'    - CLEN = ', CLEN(R)
C         PRINT *,'    - /BASIS/RULE/=/',BASIS,'/',
C       +          RULE(R)(1:CLEN(R)),'/'
C         PRINT *,'    - PTR = ', PTR

IF ((PTR .GE. 1) .AND. (PTR .LE. POS2(R)-POS1(R)+1)) THEN
C           PRINT *, 'BAS2CODE - FOUND PATTERN, R, CODE = ', R, CODE(R)
            FCODE = CODE(R)
            GOTO 999
          END IF

100     CONTINUE

GOTO 999

900     PRINT *, 'ERROR OPENING FCODE.RUL'
        GOTO 999

903     PRINT *, 'ERROR READING FCODE.RUL'
        GOTO 999
```

FIG. 6AU

```
999   CONTINUE
      RETURN
      END

SUBROUTINE CITYINFO (IERR, CITY, LAT, LONG, TZ, DST)

IMPLICIT NONE

* INPUT PARAMETERS
      INTEGER      IERR   ! 0=OK, -1=CRITICAL ERR, 1=CITY NOT FOUND
      CHARACTER*(*) CITY

* OUTPUT PARAMETERS
      CHARACTER*(*) DST
      REAL         LAT,LONG
      INTEGER      TZ

* LOCAL VARIABLES
      INTEGER      DBNAME(64), USER (5), PASS(2), DBPRIV, DIRECT (8),
     +             DTYPE, DS1(8), DS2(8), FNAME(3), RECORD(3600),
     +             RNUM, FVAL(18), CVAL(5), FLEN, IVAL, DSNAME(8),
     +             RKEY, WKEY, DSPRIV, FNLIST(18), MIN, MAX, I,
     +             OPER, SNAME(3), COUNT, DELIM
      REAL         DVAL
      LOGICAL      FIRST, MUTE, OK, OPEND, NODSET, FOUND, CMSG
     +             VALID, NOMORE
      CHARACTER*65 CITYREC(2000)
      DOUBLE PRECISION  DLAT, DLONG

* DATA STATEMENTS

DATA         FIRST / .TRUE. /

DATA         MUTE / .TRUE.
      DATA         DBNAME / 'SYS$','USER','DISK',':[ST','RATT',
     +             'ON.P','PRISM',']PLA','TFOR','M  '54*'   '/
C     DATA         DBNAME / 'PLAT' , 'FORM', 62*'    ' /
      DATA         USER  / 'OD ', 4*'    ' /
      DATA         PASS  / 'CITY', 'INFO' /
      DATA         DSNAME / 'CITY', '_ZON', 'E   ', 5*'    ' /
```

FIG. 6AV

```
        DATA      RKEY  / 'RKEY' /
        DATA      WKEY  / 'WKEY' /
        DATA      OPEND / . FALSE. /
        DATA      NODSET / .TRUE. /

*--------------------------------------------------------------------

IERR = 0
        LAT  = 0.0
        LONG = 0.0
        TZ   = 0.0
        DST  = ' '

*----------------------------------------------------
* IF THIS IS THE FIRST TIME ENTERING THIS ROUTINE, OPEN THE DATABASE
* AND DATASET, GET ALL THE CITIES AND PUT THE INFO INTO AN ARRAY.
*----------------------------------------------------

IF (FIRST) THEN
           FIRST = .FALSE.

*---    INITIALIZING INFOCEN

CALL DBMS (MUTE)

*---    OPEN THE PLATFORM DATABASE

CALL DBOPEN (OK, DBNAME, USER, PASS, DBPRIV, DIRECT, DTYPE)

IF (.NOT. OK) THEN
           WRITE (66,'(1X,A,8A4)')
     +         'CITYINFO - ERROR OPENING DATABASE: ', DBNAME
           WRITE (66,'(1X,A,5A4)')
     +         '                     USERNAME: ', USER
           WRITE (66,'1X,A,2A4)')
     +                         PASSWORD: ', PASS

IERR = -1
           GOTO 999
```

FIG. 6AW

```
        END IF

*---    CALL BEGIN MAC (A REQUIRED CALL THERE MUST NOT BE A BEGIN
*       MACRO FOR THIS PROGRAM USER

CALL BEGMAC (OK, DS1, DS2, FNAME, RECORD, RNUM, OPEND,
       +             NODSET, DBNAME)
        IF (.NOT. OK) THEN
          WRITE (66,*) 'CITYINFO - ERROR FROM BEGMAC'
          IERR = -1
          GOTO 999
        END IF

*---    OPEN THE CITY_ZONE DATASET

CALL DOPEN (OK, DSNAME, RKEY, WKEY, DTYPE, DSPRIV)

IF (.NOT. OK) THEN
          WRITE (66, '(1X,A,8A4)')
       +              'CITYINFO - ERROR OPENING DATASET:   ', DSNAME
          WRITE (66, '(1X,A,A4)')
       +              '                     READ KEY:     ', RKEY
          WRITE (66, '(1X,A,A4)')
       +              '                     WRITE KEY:    ', WKEY
          WRITE (66,*) 'CONTINUING ANYWAY'
C         IERR = -1
C         GOTO 999
        END IF

*---    SELECTING ALL THE RECORDS

CALL BLANKS (FNAME,3)
        CALL CTOH (1,'*',FNAME)

CALL SELECT (OK, DSNAME, FNAME, OPER, FVAL, SNAME, COUNT, CMSG)
        IF (.NOT. OK .OR. CMSG) THEN
          WRITE (66,*) 'CITYINFO - ERROR FROM SELECT'
          IERR = -1
          GOTO 999
        END IF
```

FIG. 6AX

```
C       WRITE (*,*) 'SELECT COUNT = ', COUNT

*---    SORT BY CITY CODE

C       WRITE (*,*) 'START SORT'
        CALL BLANKS (FNLIST,18)
        CALL CTOH (1,'CCODE', FNLIST)
        DELIM = ', '

CALL SORT (OK, DSNAME, SNAME, FNLIST, DELIM, CMSG)

IF (.NOT. OK .OR. .NOT. CMSG) THEN
          WRITE (66,*) 'CITYINFO - ERROR FROM SORT'
          IERR = -1
          GOTO 999
        END IF
C       WRITE (*,*) 'END SORT'

*---    GET EACH RECORD AND STORE IN AN ARRAY

I = 1
        RNUM = 0

C       WRITE (*,'(A)')'+         = RECORD BEING RETRIEVED'

200     CONTINUE

C       WRITE (*,'(A1,I5)') '+', I
C       WRITE (*,*) 'RETRIEVED RECORD', I

CALL SNEXT (OK, DSNAME, SNAME, RECORD, RNUM, NOMORE)

IF (.NOT. OK) THEN
          WRITE (66,*) 'CITYINFO - ERROR FROM SFIRST'

IERR = -1
          GOTO 999
        END IF

IF (.NOT. NOMORE) THEN
```

FIG. 6AY

```
        CALL HTOC (1, RECORD, CITYREC(I))
C       WRITE (*,'(1X,A,I5,A2,A65,A1)') 'REC',I,'=',CITYREC(I), 'I'
        I=I + 1
        GOTO 200
      END IF

CALL DBCLOZ(OK,.FALSE.)

END IF

*-------------------------------------------------------------------
* FIND THE CITY RECORD WANTED (POSITIONS 1:3 IN CITYREC)
* DO THIS WITH A BINARY SEARCH ON THE CITYREC ARRAY
*-------------------------------------------------------------------

MIN = 1
      MAX = COUNT

I = MAX / 2

300   CONTINUE

C     WRITE (*,*) 'CITYREC(',I,') = ',CITYREC(I)(1:3),'  MIN = ', MIN,
C    +                   ' MAX = ', MAX
      IF (I .NE. MIN) THEN

IF (CITYREC(I)(1:3) .LT. CITY) THEN
            MIN = I
            I = ((MAX - I) / 2) + I
            GOTO 300
         ELSE IF (CITYREC(I)(1:3) .GT. CITY) THEN
            MAX = I
            I = ((I - MIN / 2) + MIN
            GOTO 300
         END IF

ELSE
         IF (CITYREC(I)(1:3) .NE. CITY) THEN
            IF (CITYREC(MAX)(1:3) .EQ. CITY) THEN
               I = MAX
```

FIG. 6AZ

```
            ELSE
C             WRITE (*,*) 'CITYINFO - CITY NOT FOUND: ', CITY
              WRITE (66,*) 'CITYINFO - CITY NOT FOUND: ', CITY
              IERR = 1
              GOTO 999
            END IF
          END IF
        END IF

C       WRITE (*,'(1X,A,A65,A1)') 'FOUND=!', CITYREC(I),'!'

*---    GET THE LATITUDE

CALL CTOD (VALID, CITYREC(I)(44:52), DLAT)
        IF (.NOT. VALID) THEN
          WRITE (66,*) 'CITYINFO - ERROR FROM CTOD (LAT)'
          IERR = -1
          GOTO 999
        END IF
        LAT = DLAT
C       WRITE (*,*) 'LAT = ', LAT

*---    GET THE LONGITUDE

CALL CTOD (VALID, CITYREC(I)(53:61, DLONG)
        IF (.NOT. VALID) THEN
          WRITE (66,*) 'CITYINFO - ERROR FROM CTOD (LONG)'
          IERR = -1
          GOTO 999
        END IF
        LONG = DLONG
C       WRITE (*,*) 'LONG = ', LONG

*---    GET THE TIME ZONE

CALL CTOI (VALID, CITYREC(I)(26:27), TX)
        IF (.NOT. VALID) THEN
          WRITE (66,*) 'CITYINFO - ERROR FROM CTOI (TZ)'
          IERR = -1
          GOTO 999
```

FIG. 6BA

```
        END IF
C       WRITE (*,*) 'TZ = ', TZ

*---    GET THE DAYLIGHT SAVINGS TIME INDICATOR (Y=OBSERVED,R=YEAR
*       ROUND)

DST = CITYREC(I)(62:62)
C       WRITE (*,*) 'DST = I', DST, 'I'

*-----------------------------------------------------------------------

999     CONTINUE
        RETURN
        END

SUBROUTINE ELTTIME(DPT_DATE, DPT_HR, DPT_MIN, DPT_TZ, DPT_DST,
       +            ARR_DATE, ARR_HR, ARR_MIN, ARR_TZ, ARR_DST,
       +            TOT_HRS, TOT_MINS, STATUS)

IMPLICIT NONE

* INPUT ARGUMENTS

CHARACTER*(*) DPT_DATE, DPT_DST, ARR_DATE, ARR_DST
        INTEGER    DPT_HR, DPT_MIN, DPT_TZ
       +           ARR_HR, ARR_MIN, ARR_TZ

* OUTPUT ARGUMENTS

INTEGER    TOT_HRS, TOT_MINS, STATUS

* LOCAL VARIABLES

CHARACTER*11 DPT3_DATE, ARR3_DATE

INTEGER    D_DATE, A_DATE, IOS
        INTEGER    DAYS, ERR, YEAR, D_TIME, A_TIME, CODE

LOGICAL    OK
```

FIG. 6BB

```
        INTEGER    DST(1980:2050,2)
*             ARRAY OF START AND END DAYLIGHT SAVINGS TIME DATE/TIME
*             (((JULIAN DATE - 700000) * 10000) + 200) FOR THE YEARS
*             1980 TO 2050. THE -700000 IS TO MAKE THE NUMBER SMALL
*             ENOUGH SO *10000 DOES NOT GET TOO BIG FOR THE COMPUTER.
*             EG: 232170200
*                    \---/\/\/
*                     |  | >MINUTES
*                     |  >HOURS (2 AM STARTS DAYLIGHT SAVINGS TIME)
*                     >DAY (APRIL X, 1980 = FIRST SUNDAY IN APRIL)
*             THIS DATE/TIME VALUE WILL BE COMPARED TO THE DEPART AND
*             ARRIVE DATE/TIMES CALCULATED THE SAME WAY. THIS MAKES
*             IT EASY TO COMPARE AS OPPOSED TO CHECKING DATES, HOURS
*             AND MINUTES.

INTEGER    DST_START, DST_END
        PARAMETER  (DST_START = 1, DST_END = 2)
*             SECOND DIMENSION INDECES FOR DST

INTEGER    DST_ADJ(0:15)
*             ARRAY OF HOUR ADJUSTMENT VALUES BASED ON THE TABLE:
*             (DST = 'Y' IF DAYLIGHT SAVINGS TIME IS ACTIVE)
*             (OBS = 'Y' IF DST IS OBSERVED, 'R' IF OBSERVED YEAR-ROUND)
*             DEPART    ARRIVE    ADJUSTMENT  DST_ADJ INDEX
*             DST OBS   DST OBS
*     COL VALUE = 8  4   2   1
*             Y   Y/R  Y   Y/R     0         15
*             Y   Y/R  Y          +1         14
*             Y   Y/R       R      0         13
*             Y   Y/R             +1         12
*             Y        Y   Y/R    -1         11
*             Y        Y           0         10
*             Y             R     -1          9
*             Y                    0          8
*                 R    Y   Y/R     0          7
*                 R    Y          +1          6
*                 R        R       0          5
*                 R               +1          4
*                 -     Y   Y/R   -1          3
*                       Y          0          2
```

FIG. 6BC

```
*                      R    -1    1
*                           0     0
      DATA   DST_ADJ / 0, -1,  0, -1,  1,  0,  1,  0,
     +                 0, -1,  0, -1,  1,  0,  1,  0 /

*--- THE FOLLOWING DATA STATEMENTS WERE GENERATED FROM PROGRAM
*    DST.FOR. THIS LOOKS BAD BUT IS FASTER THAN GENERATING THEM EACH
*    TIME THE PROGRAM IS RUN.

DATA   DST(1980,1), DST(1980,2) / 232170200, 233990200 /
      DATA   DST(1981,1), DST(1981,2) / 235810200, 237630200 /
      DATA   DST(1982,1), DST(1982,2) / 239450200, 241270200 /
      DATA   DST(1983,1), DST(1983,2) / 243090200, 244910200 /
      DATA   DST(1984,1), DST(1984,2) / 246730200, 248620200 /
      DATA   DST(1985,1), DST(1985,2) / 250440200, 252260200 /
      DATA   DST(1986,1), DST(1986,2) / 254080200, 255900200 /
      DATA   DST(1987,1), DST(1987,2) / 257720200, 259540200 /
      DATA   DST(1988,1), DST(1988,2) / 261360200, 263180200 /
      DATA   DST(1989,1), DST(1989,2) / 265000200, 266820200 /
      DATA   DST(1990,1), DST(1990,2) / 268640200, 270530200 /
      DATA   DST(1991,1), DST(1991,2) / 272350200, 274170200 /
      DATA   DST(1992,1), DST(1992,2) / 275990200, 277810200 /
      DATA   DST(1993,1), DST(1993,2) / 279630200, 281450200 /
      DATA   DST(1994,1), DST(1994,2) / 283270200, 285090200 /
      DATA   DST(1995,1), DST(1995,2) / 286910200, 288730200 /
      DATA   DST(1996,1), DST(1996,2) / 290620200, 292440200 /
      DATA   DST(1997,1), DST(1997,2) / 294260200, 296080200 /
      DATA   DST(1998,1), DST(1998,2) / 297900200, 299720200 /
      DATA   DST(1999,1), DST(1999,2) / 301540200, 303360200 /
      DATA   DST(2000,1), DST(2000,2) / 305180200, 307000200 /
      DATA   DST(2001,1), DST(2001,2) / 308820200, 310710200 /
      DATA   DST(2002,1), DST(2002,2) / 312530200, 314350200 /
      DATA   DST(2003,1), DST(2003,2) / 316170200, 317990200 /
      DATA   DST(2004,1), DST(2004,2) / 319810200, 321630200 /
      DATA   DST(2005,1), DST(2005,2) / 323450200, 325270200 /
      DATA   DST(2006,1), DST(2006,2) / 327090200, 328910200 /
      DATA   DST(2007,1), DST(2007,2) / 330730200, 332620200 /
      DATA   DST(2008,1), DST(2008,2) / 334440200, 336260200 /
      DATA   DST(2009,1), DST(2009,2) / 338080200, 339900200 /
      DATA   DST(2010,1), DST(2010,2) / 341720200, 343540200 /
```

FIG. 6BD

```
DATA    DST(2011,1), DST(2011,2) / 345360200, 347180200 /
DATA    DST(2012,1), DST(2012,2) / 349000200, 350890200 /
DATA    DST(2013,1), DST(2013,2) / 352710200, 354530200 /
DATA    DST(2014,1), DST(2014,2) / 356350200, 358170200 /
DATA    DST(2015,1), DST(2015,2) / 359990200, 361810200 /
DATA    DST(2016,1), DST(2016,2) / 363630200, 365450200 /
DATA    DST(2017,1), DST(2017,2) / 367270200, 369090200 /
DATA    DST(2018,1), DST(2018,2) / 370910200, 372800200 /
DATA    DST(2019,1), DST(2019,2) / 374620200, 376440200 /
DATA    DST(2020,1), DST(2020,2) / 378260200, 380080200 /
DATA    DST(2021,1), DST(2021,2) / 381900200, 383720200 /
DATA    DST(2022,1), DST(2022,2) / 385540200, 387360200 /
DATA    DST(2023,1), DST(2023,2) / 389180200, 391000200 /
DATA    DST(2024,1), DST(2024,2) / 392890200, 394710200 /
DATA    DST(2025,1), DST(2025,2) / 396530200, 398350200 /
DATA    DST(2026,1), DST(2026,2) / 400170200, 401990200 /
DATA    DST(2027,1), DST(2027,2) / 403810200, 405630200 /
DATA    DST(2028,1), DST(2028,2) / 407450200, 409270200 /
DATA    DST(2029,1), DST(2029,2) / 411090200, 412980200 /
DATA    DST(2030,1), DST(2030,2) / 414800200, 416620200 /
DATA    DST(2031,1), DST(2031,2) / 418440200, 420260200 /
DATA    DST(2032,1), DST(2032,2) / 422080200, 423900200 /
DATA    DST(2033,1), DST(2033,2) / 425720200, 427540200 /
DATA    DST(2034,1), DST(2034,2) / 429360200, 431180200 /
DATA    DST(2035,1), DST(2035,2) / 433000200, 434890200 /
DATA    DST(2036,1), DST(2036,2) / 436710200, 438530200 /
DATA    DST(2037,1), DST(2037,2) / 440350200, 442170200 /
DATA    DST(2038,1), DST(2038,2) / 443990200, 445810200 /
DATA    DST(2039,1), DST(2039,2) / 447630200, 449450200 /
DATA    DST(2040,1), DST(2040,2) / 451270200, 453160200 /
DATA    DST(2041,1), DST(2041,2) / 454980200, 456800200 /
DATA    DST(2042,1), DST(2042,2) / 458620200, 460440200 /
DATA    DST(2043,1), DST(2043,2) / 462260200, 464080200 /
DATA    DST(2044,1), DST(2044,2) / 465900200, 467720200 /
DATA    DST(2045,1), DST(2045,2) / 469540200, 471360200 /
DATA    DST(2046,1), DST(2046,2) / 473180200, 475070200 /
DATA    DST(2047,1), DST(2047,2) / 476890200, 478710200 /
DATA    DST(2048,1), DST(2048,2) / 480530200, 482350200 /
DATA    DST(2049,1), DST(2049,2) / 484170200, 485990200 /
DATA    DST(2050,1), DST(2050,2) / 487810200, 489630200 /
```

STATUS = 0

*----------------------------------------------------------------
* CONVERT EVERYTHING INTO INTEGERS FOR CALCULATIONS
*----------------------------------------------------------------

*-- PUT DATES INTO FORMAT 3 FOR JULIAN CALL
    CALL DATE123 (DPT_DATE, DPT3_DATE, STATUS)
    IF (STATUS .NE. 0) GOTO 900

CALL DATE123 (ARR_DATE, ARR3_DATE, STATUS)
    IF (STATUS .NE. 0) GOTO 900

CALL JULIAN (OK, 3, DPT3_DATE, D_DATE, ERR)
    IF (.NOT. OK .OR. ERR .NE. 0) THEN
       WRITE (66,*) 'ELTIME - ERROR FROM JULIAN. DPT3_DATE=',DPT3_DATE
       GOTO 900
    END IF

CALL JULIAN (OK, 3, ARR3_DATE, A_DATE, ERR)
    IF (.NOT. OK .OR. ERR .NE. 0) THEN
       WRITE (66,*) 'ELTIME - ERROR FROM JULIAN. ARR3_DATE=',ARR3_DATE
       GOTO 900
    END IF

*----------------------------------------------------------------
* CALCULATE THE ELAPSED TIME (HRS, MINS) AS IF THERE ARE NO TIME ZONE
* OR DAYLIGHT SAVINGS TIME DIFFERENCES.  THIS IS THE STARTING POINT.
*----------------------------------------------------------------

TOT_HRS = 0.0

DAYS    = A_DATE - D_DATE
    TOT_HRS = ARR_HR - DPT_HR
    TOT_HRS = TOT_HRS + (DAYS * 24)

TOT_MINS = ARR_MIN - DPT_MIN
```

FIG. 6BF

```
IF (TOT_MINS .LT. 0) THEN
   TOT_HRS = TOT_HRS - 1.0
   TOT_MINS = TOT_MINS + 60
END IF
```

*----------------------------------------------------------------
* NOW FACTOR IN THE TIME ZONE DIFFERENCES.  (TIME ZONES INCREASE AS
* YOU TRAVEL WEST).
*----------------------------------------------------------------

```
TOT_HRS = TOT_HRS + ARR_TZ - DPT_TZ
```

*----------------------------------------------------------------
* NOW DETERMINE IF ANY ADJUSTMENT NEEDS TO BE MADE FOR DAYLIGHT
* SAVINGS TIME DIFFERENCES.  SEE TABLE ABOVE FOR THE VALUE OF CODE.
*----------------------------------------------------------------

*-- USE THE DEPART YEAR AS THE INDEX INTO THE DST ARRAY.

```
READ (DPT3_DATE(8:11), '(I4)', IOSTAT=IOS) YEAR
IF (IOS .NE. 0) THEN
   WRITE (66,*) 'ELTIME - ERROR CONV TO INT*4, DPT3_DATE(8:11)= ',
 +              DPT3_DATE(8:11)
   GOTO 900
END IF

D_TIME = ((D_DATE - 700000) * 10000) + (DPT_HR * 100) + DPT_MIN

A_TIME = ((A_DATE - 700000) * 10000) + (ARR_HR * 100) + ARR_MIN

CODE = 0

IF (D_TIME .GT. DST(YEAR,DST_START) .AND.
 +  D_TIME .LT. DST(YEAR,DST_END))   THEN
   CODE = CODE + 8
   IF (DPT_DST .EQ. 'Y') CODE = CODE + 4
END IF

IF (DPT_DST .EQ. 'R') CODE = CODE + 4
```

FIG. 6BG

```
      IF (A_TIME .GT. DST(YEAR,DST_START) .AND.
   +  A_TIME .LT. DST(YEAR,DST_END))  THEN
         CODE = CODE + 2
         IF (ARR_DST .EQ. 'Y') CODE = CODE + 1
      END IF

IF (ARR_DST .EQ. 'R') CODE = CODE + 1

*-- MAKE DAYLIGHT SAVINGS ADJUSTMENT

TOT_HRS = TOT_HRS + DST_ADJ(CODE)

GOTO 999

900 CONTINUE
      STATUS = 1

999 CONTINUE
      END

***********************************************************************

SUBROUTINE DATE123 (DATE1, DATE3, STATUS)

IMPLICIT NONE

* INPUT ARGUMENTS

CHARACTER*(*) DATE1

* OUTPUT ARGUMENTS

CHARACTER*(*) DATE3
      INTEGER       STATUS

* LOCAL VARIABLES

CHARACTER*3  MONTH(12)
      INTEGER      YEAR, MON, IOS
```

FIG. 6BH

```
      DATA     MONTH / 'JAN', 'FEB', 'MAR', 'APR', 'MAY', 'JUN',
     +                 'JUL', 'AUG', 'SEP', 'OCT', 'NOV', 'DEC' /

STATUS = 0
      DATE3 = '**-***-****'

READ (DATE1(1:2), '(I2)', IOSTAT=IOS) YEAR
      IF (IOS .NE. 0) THEN
         WRITE (66,*) 'DATE123 - ERROR CONV TO INT*2, DATE1(1:2) = ',
     +                DATE1(1:2)
         GOTO 900
      END IF

IF (YEAR .GT. 50) THEN
         YEAR = 1900 + YEAR
      ELSE
         YEAR = 2000 + YEAR
      END IF

READ (DATE1(4:5), '(I2)', IOSTAT=IOS) MON
      IF (IOS .NE. 0) THEN
         WRITE (66,*) 'DATE123 - ERROR CONV TO INT*2, DATE1(4:5) = ',
     +                DATE1(4:5)
         GOTO 900
      END IF

IF ((MON .LE. 0) .OR. (MON .GT. 12)) THEN
         WRITE (66,*) 'DATE123 - ERROR MONTH OUT OF RANGE: ', MON
         GOTO 900
      END IF

WRITE (DATE3, '(A2,A1,A3,A1,I4)', IOSTAT=IOS)
     +              DATE1(7:8), '-', MONTH(MON), '-', YEAR
      IF (IOS .NE. 0) THEN
         WRITE (66,*) 'DATE123 - ERROR WRITING DATE3: '
         WRITE (66,*) '      DATE1(7:8) = ', DATE1(7:8)
         WRITE (66,*) '      MONTH(MON) = ', MONTH(MON)
         WRITE (66,*) '      YEAR       = ', YEAR
         GOTO 900
      END IF
```

FIG. 6BI

```
      GOTO 999

900   CONTINUE
      STATUS = 1

999   CONTINUE
      END
```

FIG. 6BJ

EXAMPLE OF O&D PROCESSING
DATA DERIVED FROM COMPUTER SYSTEM

FIGURE 7A

| CASE | INVOICE: NUMBER | DATE | CARRIER | FARE BASIS | FLIGHT NUMBER | DEPART: DATE | HR | MIN | ARRIVE: DATE | HR | MIN | SEGMENTS FROM | TO | SEGMENT AMOUNT WITHOUT TAX |
|---|---|---|---|---|---|---|---|---|---|---|---|---|---|---|
| CASE 1 | 290 | 01-SEP-89 | CO | Y | 421 | 08-SEP-89 | 8 | 40 | 08-SEP-89 | 10 | 6 | EWR | BUF | 131.56 |
|  |  |  | CO | Y | 707 | 10-SEP-89 | 13 | 20 | 10-SEP-89 | 14 | 30 | BUF | EWR | 131.56 |
| CASE 2 | 294 | 01-SEP-89 | UA | VRFLYUA | 231 | 10-SEP-89 | 10 | 30 | 10-SEP-89 | 11 | 33 | EWR | ORD | 0.00 |
|  |  |  | UA | VRFLYUA | 1569 | 10-SEP-89 | 13 | 15 | 10-SEP-89 | 15 | 5 | ORD | PDX | 137.08 |
| CASE 3 | 308 | 06-SEP-89 | CO | BA14P50 | 145 | 27-SEP-89 | 17 | 15 | 27-SEP-89 | 18 | 33 | EWR | IAH | 0.00 |
|  |  |  | CO | BA14P50 | 1642 | 27-SEP-89 | 20 | 5 | 27-SEP-89 | 21 | 26 | IAH | PHX | 141.68 |
|  |  |  | CO | K | 1236 | 30-SEP-89 | 10 | 20 | 30-SEP-89 | 11 | 10 | PHX | DEN | 0.00 |
|  |  |  | CO | K | 233 | 30-SEP-89 | 13 | 20 | 30-SEP-89 | 19 | 18 | DEN | EWR | 187.68 |
| CASE 4 | 317 | 06-SEP-89 | CO | QE7P25 | 556 | 27-SEP-89 | 16 | 15 | 27-SEP-89 | 17 | 33 | EWR | IAH | 0.00 |
|  |  |  | CO | QE7P25 | 2288 | 27-SEP-89 | 18 | 4 | 27-SEP-89 | 19 | 42 | IAH | DEN | 0.00 |
|  |  |  | CO | QE7P25 | 3566 | 27-SEP-89 | 20 | 27 | 27-SEP-89 | 21 | 17 | IAH | PHX | 123.28 |
|  |  |  | UA | QE7P25 | 310 | 02-OCT-89 | 15 | 10 | 02-OCT-89 | 15 | 60 | PHX | DEN | 0.00 |
|  |  |  | UA | QE7P25 | 467 | 02-OCT-89 | 18 | 19 | 02-OCT-89 | 13 | 57 | DEN | LGA | 123.28 |

ROW COUNT 12

FIGURE 7B

EXAMPLE OF O&D PROCESSING
PROCESSED DATA: SECTION A

| CASE | INVOICE: NUMBER | DATE | CARRIER | FARE BASIS | FLIGHT NUMBER | DEPART: DATE | HR | MIN | ARRIVE: DATE | HR | MIN |
|---|---|---|---|---|---|---|---|---|---|---|---|
| CASE 1 | 290 | 01-SEP-89 | CO | Y | 421 | 08-SEP-89 | 8 | 40 | 08-SEP-89 | 10 | 6 |
| CASE 1 | 290 | 01-SEP-89 | CO | Y | 707 | 10-SEP-89 | 13 | 20 | 08-SEP-89 | 14 | 30 |
| CASE 2 | 294 | 01-SEP-89 | UA | VRFLYUA | 231 | 10-SEP-89 | 10 | 30 | 10-SEP-89 | 15 | 5 |
| CASE 3 | 308 | 06-SEP-89 | CO | BA14P50 | 145 | 27-SEP-89 | 17 | 15 | 27-SEP-89 | 21 | 26 |
| CASE 3 | 308 | 06-SEP-89 | CO | K | 1236 | 30-SEP-89 | 10 | 20 | 30-SEP-89 | 19 | 18 |
| CASE 4 | 317 | 06-SEP-89 | CO | QE7P25 | 556 | 27-SEP-89 | 15 | 15 | 27-SEP-89 | 21 | 17 |
| CASE 4 | 317 | 06-SEP-89 | UA | QE7P25 | 310 | 02-OCT-89 | 14 | 10 | 02-OCT-89 | 22 | 57 |

ROW COUNT 7

EXAMPLE OF O&D PROCESSING
PROCESSED DATA: SECTION B
DATA DERIVED FROM ANALYSIS

| CASE | ORIGIN AND DESTINATION ORG CXN DES | | | SEGMENT COUNT | SEGMENT AMOUNT WITH TAX | MILES | COST PER MILE | TRIP TIME: HR | MIN | COST PER HOUR | FAREDEX CODE | DAYS ADVANCE PURCHASE |
|---|---|---|---|---|---|---|---|---|---|---|---|---|
| CASE 1 | EWR | | BUF | 1 | 142.08 | 281 | 0.51 | 1 | 26 | 99.13 | COACH | 7 |
| CASE 1 | BUF | | EWR | 1 | 142.08 | 281 | 0.51 | 1 | 10 | 121.79 | COACH | 9 |
| CASE 2 | EWR | ORD | PDX | 2 | 148.05 | 2433 | 0.06 | 7 | 35 | 19.52 | RT | 9 |
| CASE 3 | EWR | IAH | PHX | 2 | 153.01 | 2433 | 0.06 | 6 | 11 | 24.75 | AP14 | 21 |
| CASE 3 | PHX | DEN | EWR | 2 | 202.69 | 2433 | 0.08 | 6 | 58 | 29.09 | DCAP | 24 |
| CASE 4 | EWR | 2 | PHX | 3 | 133.14 | 2433 | 0.05 | 7 | 2 | 18.93 | RTR | 21 |
| CASE 4 | PHX | DEN | LGA | 2 | 133.14 | 2148 | 0.06 | 6 | 47 | 19.63 | RTR | 26 |

ROW COUNT 7

SYSTEM FOR SYNTHESIZING TRAVEL COST INFORMATION

TECHNICAL FIELD

The present invention relates to the travel industry, and more particularly to methods and apparatus forming a system for deriving from computer-based travel reservation systems specific cost and time information, on per-unit bases, such that accurate cost information may be produced for comparison purposes. More specifically, information available for multiple individual segments of a given trip between two points (origination-to-destination) is reduced to a common per-unit basis permitting uniform comparison and analysis. The process identifies each block of origin and destination data by a unique name, permitting calculation of the number of connecting segments flown, the number of miles flown, and the amount of time from departure to arrival. These systems for synthesizing travel cost information are called Origin and Destination ("O&D") analyzers.

BACKGROUND OF THE INVENTION

Certain travel industry groups, notably the United States-based airline industry, developed computer-based reservation system databases in the period generally corresponding to 1965 to 1975, and in which reservation systems flight information was based on the traveler's desired origination-to-destination journey. The air travel industry settled on several similar systems, including COVIA (United Airlines, USAIR); DATAS II (Delta Airlines); PARS (TWA and Northwest); SABRE (American Airlines); and SYSTEMONE (Texas Air Corporation) in order to enable reference to schedule and tariff information among many parties. The data was arranged, organized, and stored in a format generally corresponding to the dominant travel routing patterns, in which a carrier accepted a passenger at a first, origination location and discharged the passenger at a terminal or destination location. The data is generally stored in several databases within each reservation system: schedules, tariffs, and rules. Booking a flight involves creating a computer record called the Passenger Name Record (PNR) of data from each of these sub-databases. As flights are booked for different carriers, a teletype message with the flight information is passed between airlines via ARINC, an air travel data communication service. Reservation data may also bypass ARINC and be exchanged directly between airline computers. The PNR is used to generate tickets, itineraries, and the "interface record" that is used by travel agency accounting systems. Information on flights flown by travelers may be obtained from the airlines in three ways: via agency accounting systems, branch interface, or the Airline Reporting Corporation.

Within agency accounting systems, the travel agencies receive the interface record in on-site accounting systems which record the amount payable due to the airline issuing the ticket and the receivable due from the client. This reservation data may also be used to monitor agent productivity and to furnish clients with some information on their expenditures.

With the branch interface, third-party groups, such as airline ticket auditors may establish a "branch access" with the airline reservation systems to receive the Passenger Name Record. Data from the PNR may then be placed into secondary computer systems for analysis and reporting.

With the Airline Reporting Corporation, airline reservation data is also provided to groups, such as credit card companies, which are involved with the Airline Reporting Corporation for the payment of airline tickets. These groups also place the data into secondary computer systems for reporting purposes.

In domestic air travel, the need for multiple stops for fuel, passengers, etc. was relatively unimportant during the inauguration of the reservation databases, as the travel companies were anxious to meet the passengers, demands for direct, and preferably non-stop flights from origin to destination. Occasionally, the vehicle would make such a stop if the intermediate landing could add revenue without unneeded delay, or otherwise to provide regulated service; these flights often offered slightly reduced fares to compensate the passenger for the inconvenience.

For these essentially direct flights, no change of planes was necessary, and the reservation systems database PARS format display of the flight data could be a single-line entry or display (whether on paper or on a computer display screen), showing flight number and origination, destination, departure and arrival times, class of service, price, and so forth. Deriving the distance traveled presented little or no problem as the flights were essentially direct or shortest path in nature, and the cost and time information were implicit from the departure/arrival times and ticket office.

Beginning about 1975, however, the travel industry, and especially the United States-based airline industry underwent a fundamental change in the nature of operations, in which fare competition forced greater emphasis on economically transporting passengers and less on travel time and convenience for the traveler. This change was accompanied by the substitution of a hub-and-spoke, multiple-segmented arrangement for the previous conventional direct flight arrangement. That is, regional airports became "hubs," and the flight paths were between the hubs rather than direct from origin to destination.

At the same time, the PARS format data display and presentation method became outdated because many trips became multiple-segment flights, often with change of aircraft. Since the passenger paid only for the trip cost on the basis of the origin-to-destination, not the total of the cost of the individual flight segments at their normal prices, this total trip cost information could not be divided among the segments without severe distortion or overload of the computerized database.

With the advent of the hub-and-spoke system, each travel segment between hubs required a separate data display line. The segments were listed in order, and the ticket price information listed on only one of the segment lines. Thus the PARS format data was forced to require multiple lines for the full, origin-to-destination data as the schedule information became more complex in order to show the movement between the hubs. Only one segment, usually the terminal segment, included price information. Total travel time could be determined for each of the segments, but departure to arrival time, and especially flight travel time, became distributed among the various segment lines, and thus obscure or hidden, making travel per unit of time exceedingly difficult to determine when the traveler's time expense became a factor. Determining real costs for travel became extremely complicated and time-consuming as extracting the information and determining true travel parameters is an essentially judgment-based activity relying on information which often changes, and generally changes too frequently to enable reliable human analysis.

An example of this is demonstrated by a flight from New York/Kennedy to Los Angeles International airport (respectively, NYC and LAX). A non-stop flight might be listed with the following reservation format information (certain information is omitted here for simplicity, i.e., departure/ arrival times, etc.:

| Origin | Destination | Price |
|---|---|---|
| NYC | LAX | $900.00 |

A similar direct flight might stop briefly in Kansas City with no discernible difference in origination-to-destination travel distance, having a slightly reduced fare, and resulting in the following reservation system format information:

| Origin | Destination | Price |
|---|---|---|
| NYC | LAX (KCY) | $750.00 |

Under the hub-and-spoke system, a similar flight might originate in New York, change planes in Atlanta, and then go on to Los Angeles. Such a hub-and-spoke trip will have a much longer origination-to-destination travel distance, have a similar fare, and result in the following information:

| Origin | Destination | Price |
|---|---|---|
| NYC | ATL | $000.00 |
| ATL | LAX | 750.00 |

A more complex series of segments might include a first stop in Atlanta, travel to Denver with a change of airplanes, then on to Los Angeles. This might be displayed as follows:

| Origin | Destination | Price |
|---|---|---|
| NYC | ATL | $000.00 |
| ATL | DEN | 000.00 |
| DEN | LAX | 750.00 |

Clearly, segment data is more difficult to present. It is not displayed on a single line but rather on multiple lines in a manner which greatly complicates the determination of associated data.

Flight time information for a given flight is also obscured; a given non-stop flight might be listed with the following format time information:

| Origin | Destination | Price | Depart | Arrive |
|---|---|---|---|---|
| NYC | LAX | $900.00 | 08:15 AM | 1:15 PM |

Now examining a similar flight, again with a stop at Kansas City, the following information might be displayed:

| Origin | Destination | Price | Depart | Arrive |
|---|---|---|---|---|
| NYC | LAX (KCY) | $750.00 | 08:15 AM | 2:00 PM |

Here, the slight difference is obviously an accumulation of the additional landing, ground, and take-off time for the Kansas City stop, which information is again easily determined. The total travel time in this example is, simply, 5 hours and 45 minutes plus 3 hours for the time zone conversion.

A hub-and-spoke trip stopping in Atlanta, however, might be displayed:

| Origin | Destination | Price | Depart | Arrive |
|---|---|---|---|---|
| NYC | ATL | $000.00 | 8:15 AM | 11:15 AM |
| ATL | LAX | $750.00 | 12:15 PM | 5:15 PM |

And a flight from New York to Los Angeles with a stop in Atlanta and a change of planes in Denver may be displayed as:

| Origin | Destination | Price | Depart | Arrive |
|---|---|---|---|---|
| NYC | ATL | $000.00 | 8:15 AM | 11:15 AM |
| ATL | DEN | 000.00 | 12:15 PM | 1:15 PM |
| DEN | LAX | $750.00 | 3:15 pM | 6:45 PM |

The total flight time of the individual segments is greater than the flight time of either a non-stop or a direct, one-stop flight, and without indicating arrival/-departure/arrival delays for the segments, the information available from the reservation system database distorts the total travel time unless origination departure to destination arrival times are separately available; they are ordinarily displayed on separate reservation lines, adding difficulty in determining the total travel time determination. Multiple stops in different time zones, especially on an East to West flight, tends to obscure the flight time when only segment flight data is available.

The segment data available does not permit determining the shortest distance between points. Cost-per-unit time and/or distance and both total travel time and time-per-unit determinations are very difficult to obtain from the above example. Without a standardized reference of costs, such as cost per mile or kilometer, and without an accumulated or other time reference, the cost per mile and cost per hour cannot readily be determined.

SUMMARY OF THE INVENTION

The present invention combines a programmable computer with a processor, such as a microprocessor, with communication links to one or more remote reservation system databases accessible via computer, output display or printing terminals for providing human-readable output, and a machine-readable program instruction set to provide a system for determining true origin-to-destination travel data from segment travel information stored as segment data in a travel reservation database system. From the complex segment information, the present invention derives certain travel information not explicitly contained within the segment data, and through reference to a separate local database or data storage unit, determines true travel cost and time data with reference to standard units, providing for example, cost-per-distance-unit and travel distance-per-time-unit, enabling further processing to determine effective direct costs such as fare price and indirect costs such as travel costs per unit of employee time.

The segment data is processed according to the program instruction set to provide a unique, single line block of data reflecting the segment-derived data block, then a unique identification tag or name is associated with the data. As necessary, longitude and latitude information for the origin and the destination is retrieved from another, local database, and great circle distance calculations performed to determine the true distance between origin and destination. Also as necessary, the fare basis codes are assessed to determine the most restrictive fare rule applicable to the particular trip and translated into a FareDex code, and the trip is then analyzed to determine the advance purchase period between purchase and travel, which information can supplement the FareDex code. As necessary, the departure and arrival times are adjusted for time zone differences (as well as Standard/Daylight Savings time variations) to determine the trip time. The great circle distance, the fare cost, and the trip time are then subjected to further calculations to determine cost per mile, cost per hour, and distance per hour.

It is an object of this invention to improve the reliability of actual cost determinations in calculating travel expenses.

It is an object of this invention to improve the reliability of actual travel time determinations in calculating travel expense.

It is an object of this invention to improve the reliability of actual cost determinations, including paid travel time in calculating travel expenses.

A feature of the present invention is the determination of actual shortest-path travel distances from a series of travel segment data.

Another feature of the present invention is the association of a group of segment data with a unique label or tag.

BRIEF DESCRIPTION OF THE DRAWING FIGURES

With these and other objects, features and advantages of the invention that will hereinafter become apparent, the nature of the invention may be more clearly understood by reference to the following description of the best mode of the invention, the appended claims, and the several views presented in the attached drawing figures, in which like reference numbers represent like elements in all views:

FIG. 6, consisting of 6AA–6B, is an object code listing of the program instruction set used by applicants;

FIGS. 7a and 7b illustrate four examples of use of the present invention; and

FIG. 8 shows a subroutine for correcting the origin-to-destination fare.

BEST MODE FOR CARRYING OUT THE INVENTION

Figure 1:
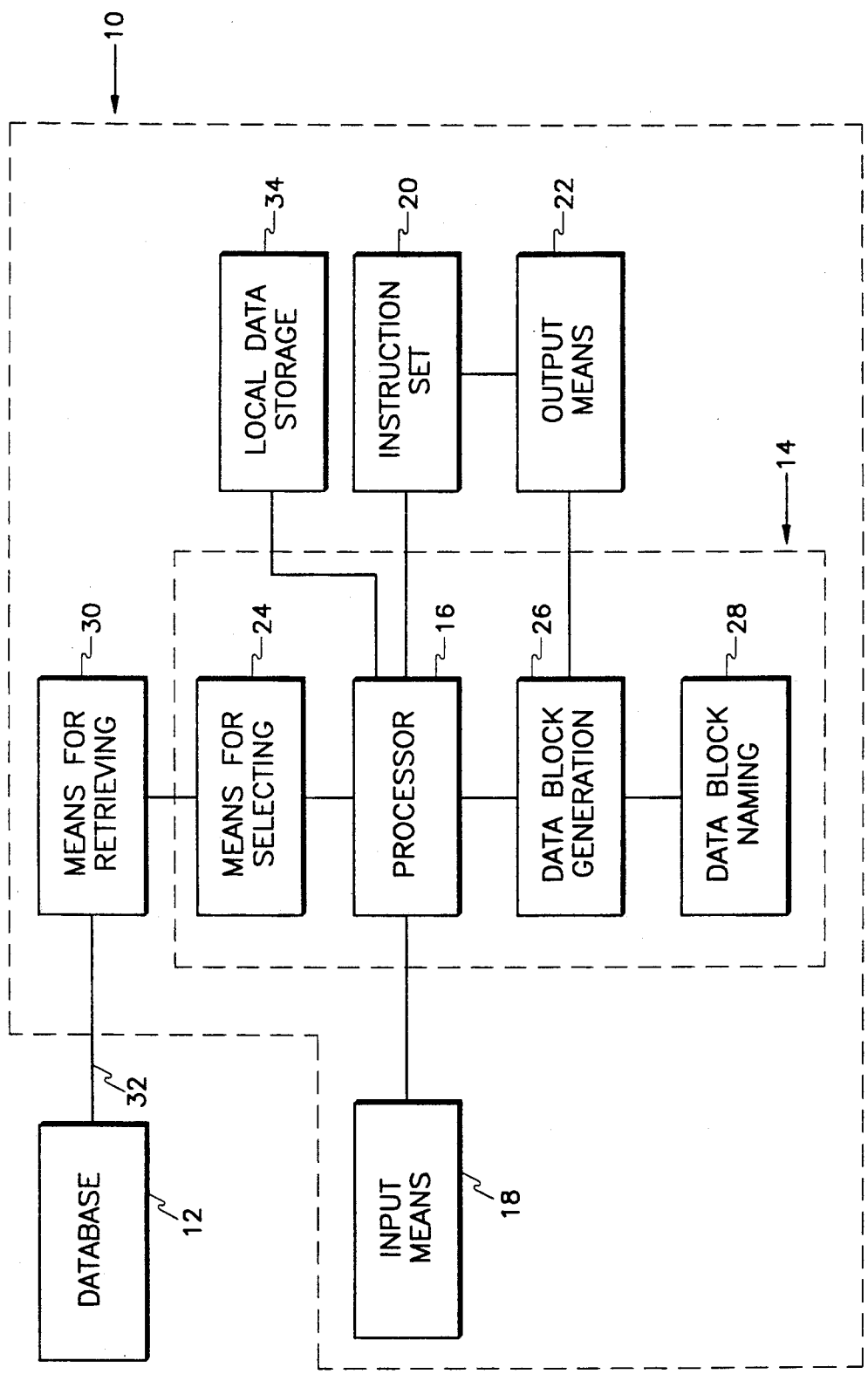
FIG. 1 is a simplified block diagram of the invention.

The system for synthesizing accurate travel costs forming the present invention 10, also known as an Origin and Destination analyzer, is shown in simplified block diagram form in FIG. 1. Remote from the system 10 is a travel reservation database system 12 such as COVIA, PARS, or SABRE in which detailed information about a given trip, such as an air travel trip, is stored as a collection of multiple-segment portions of the trip. The present system 10 alternatively envisions the substitution of such a reservation database system by any other database storage systems capable of locally storing large amounts of data, including optical storage technology or the like, such as may be provided with compact disk-read only memory (CD-ROM) and write once, read many times (WORM) storage devices. A programmable computer 14, including a processor 16 (central processing unit), provides a means for manipulating travel data and performing multiple calculations; it may be preferably situated at a location designated for use of the present system 10, such as a travel agent's main or remote office, or a corporate business or government office. Plural systems may be linked, and plural terminals may be linked as subsystems to a system 10. Also included with the programmable computer 14 are an input device 18 such as a terminal and which is connected to processor 16, an instruction set 20 in communication with processor 16 for directing control thereof, and at least one output device 22, such as a display unit or printer, also connected to the processor. Further elements of the system 10 include a means for selecting data 24, a data block generation means 26, and a data block naming means 28, which elements may be included as operating portion's of the programmable computer 14.

External to the programmable computer 14, and forming a part of the system 10 are a data communications and retrieval unit 30 and associated telecommunications link 32 in signal communication with the remote travel reservation database system 12. These elements preferably comprise a high-speed modem and telephone line or the equivalents thereof. In the case of the travel reservation database system 12 being located with the system 10 of the invention, the telecommunications link may simply be a cable or the equivalent. Direct link, leased lines, and radio communication may also be used.

Figure 2:
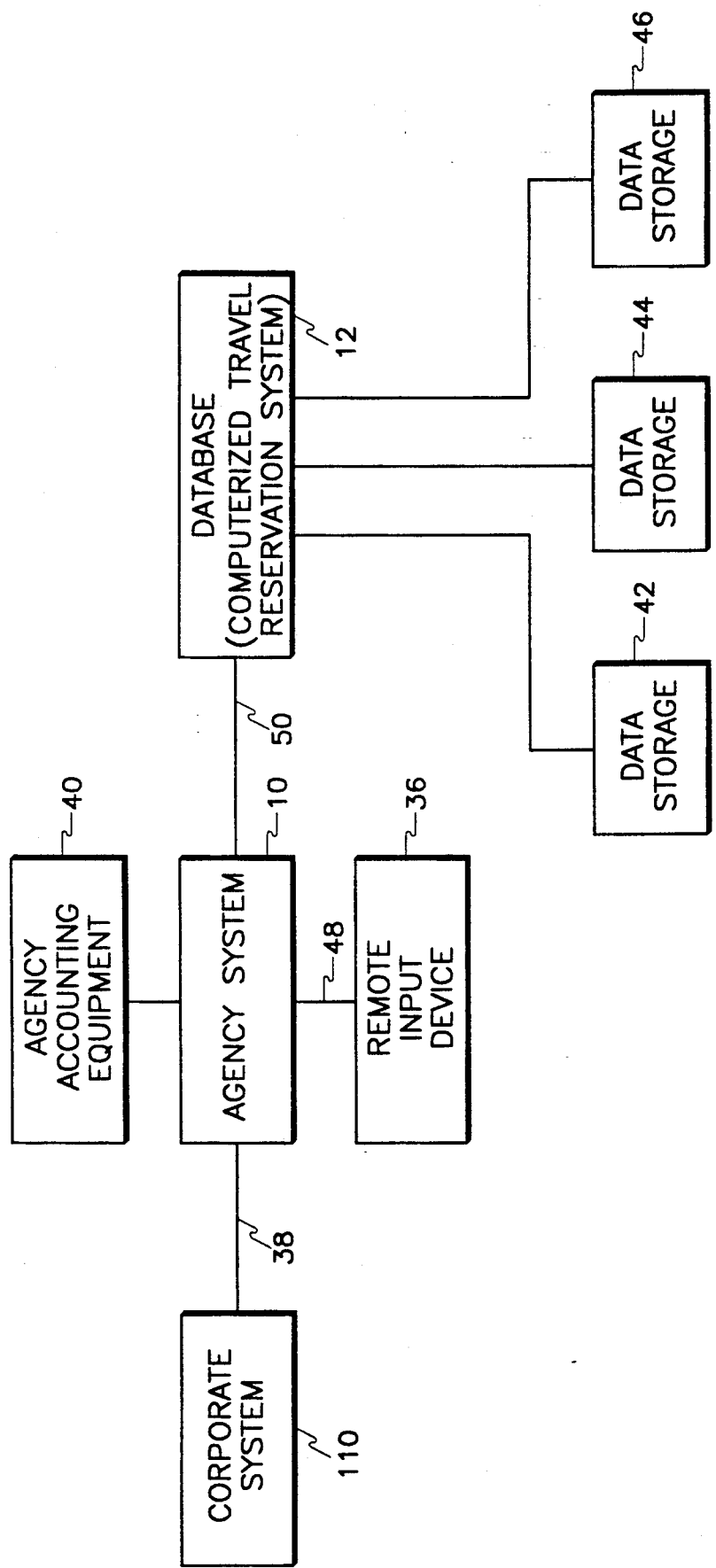
FIG. 2 is a more detailed block diagram of the invention, including certain additional features.

Turning now to FIG. 2, an expanded network of Origin and Destination analyzer systems for synthesizing accurate travel data according to the present invention is illustrated in greater detail, including illustration of plural systems at different locations and a remote subsystem connected to one system. A system 10 for determining true origin-to-destination travel data from segment travel information stored as segment data in a computer-based travel reservation database 12 is installed at a travel agency, and having the terminal 18 and processor 16 for capturing, storing and processing segment data and the data communications and retrieval unit 30 and telecommunication link 32 shown in FIG. 1. The system 10 communicates with a computerized travel reservation system 12, also as shown in FIG. 1. The system 10 may also include or be connected to a corporate operated travel management system 110 for storing and processing segment data having a terminal and a processor, via another telecommunications link 38 to the travel agency's Origin and Destination analyzer system 10 or to computerized accounting equipment 40 when available. The travel agency system 10 is joined to the remote travel reservation database system 12 where multiple data storage units 42, 44, 46 are usually located for storing schedule information (i.e., the schedule segment data), tariff or fare price data, and fare rules data, respectively.

Upon the completion of the booking of a particular trip, the travel segments forming the complete booked trip are requested via the data communication and retrieval unit 30 via telecommunications link 32 and communicated back to the travel agency Origin and Destination analyzer system 10 or computerized accounting equipment 40. The segment data may be processed at the agency or communicated to the corporation travel management system 110 via telecommunications link 38 for local processing there.

Figure 3:
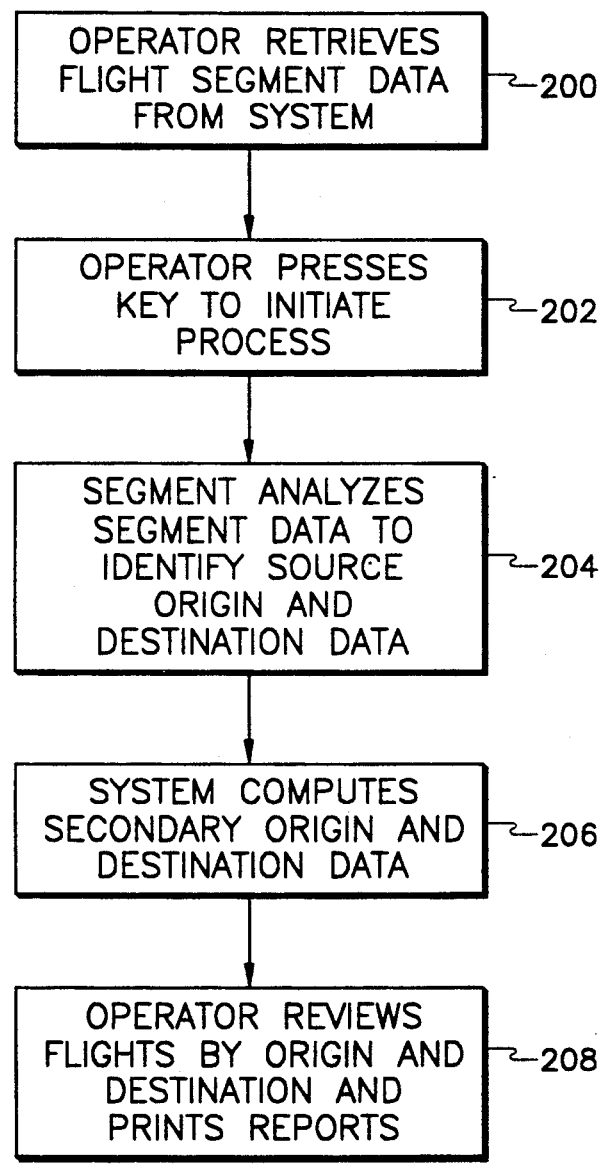
FIG. 3 is a summary of the analysis procedure performed according to the method of the invention.

Operation of the travel cost information system 10 in its broadest sense is illustrated in flow chart form in FIG. 3. The system 10 is initialized to prepare for operation, then a system operator enters data through input means 18 to control retrieval of flight segment data from a travel reservation database system 12 via the retrieval means 30 at step 200, which may be accomplished through program instruction set 20 control, with assistance from the program instruction set 20, or separately, as determined by the system and software configuration available. This segment data is captured from the database 12 and particularly, from the data storage 42, and then stored locally within the programmable computer 14. Data may also be retrieved from the data storage 44 or 46. The data retrieval is to be routinely accomplished at the time of flight reservation and ticketing. This information may also be retrieved prior to making the reservation, or thereafter for later analysis, including after the trip has been completed, provided that the database 12 data has not been updated to destroy the applicable data. Once the segment data is received from database 12, the operator initiates the program instruction set 20 routines via the input means 18 at step 202, initiating analysis and processing of the retrieved segment data into true origin and destination data by the programmable computer 14 at step 204. Processing of the segment data (steps 204 and 206) is shown in FIG. 4 and described in greater detail hereinafter.

In step 206, the programmable computer 14 generates true origin and destination data for the selected trip. In order to simplify further processing of data associated with the selected trip, the programmable computer 14 (operating under control of the program instruction set 20) assigns a new name or identification tag for the true O&D data block in step 206.

The operator may also then select and initiate routines of the program instruction set 20 to compute the O&D fare, the O&D distance, the O&D trip time, the O&D cost per unit distance traveled, the O&D cost per trip time, the O&D cost per unit of time, and/or the fare base according to standard fare codes. This information may be displayed for review by the operator and printed out or otherwise communicated to a client at step 208.

Figure 4A:
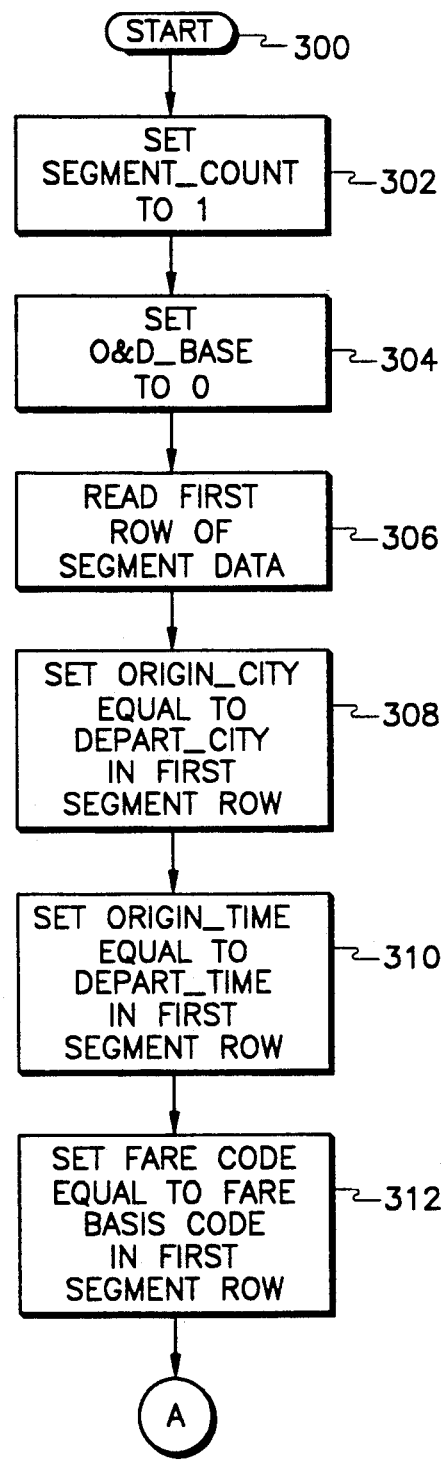
FIG. 4 is a simplified flow chart illustrating portions of the analysis procedure.
Figure 4B:
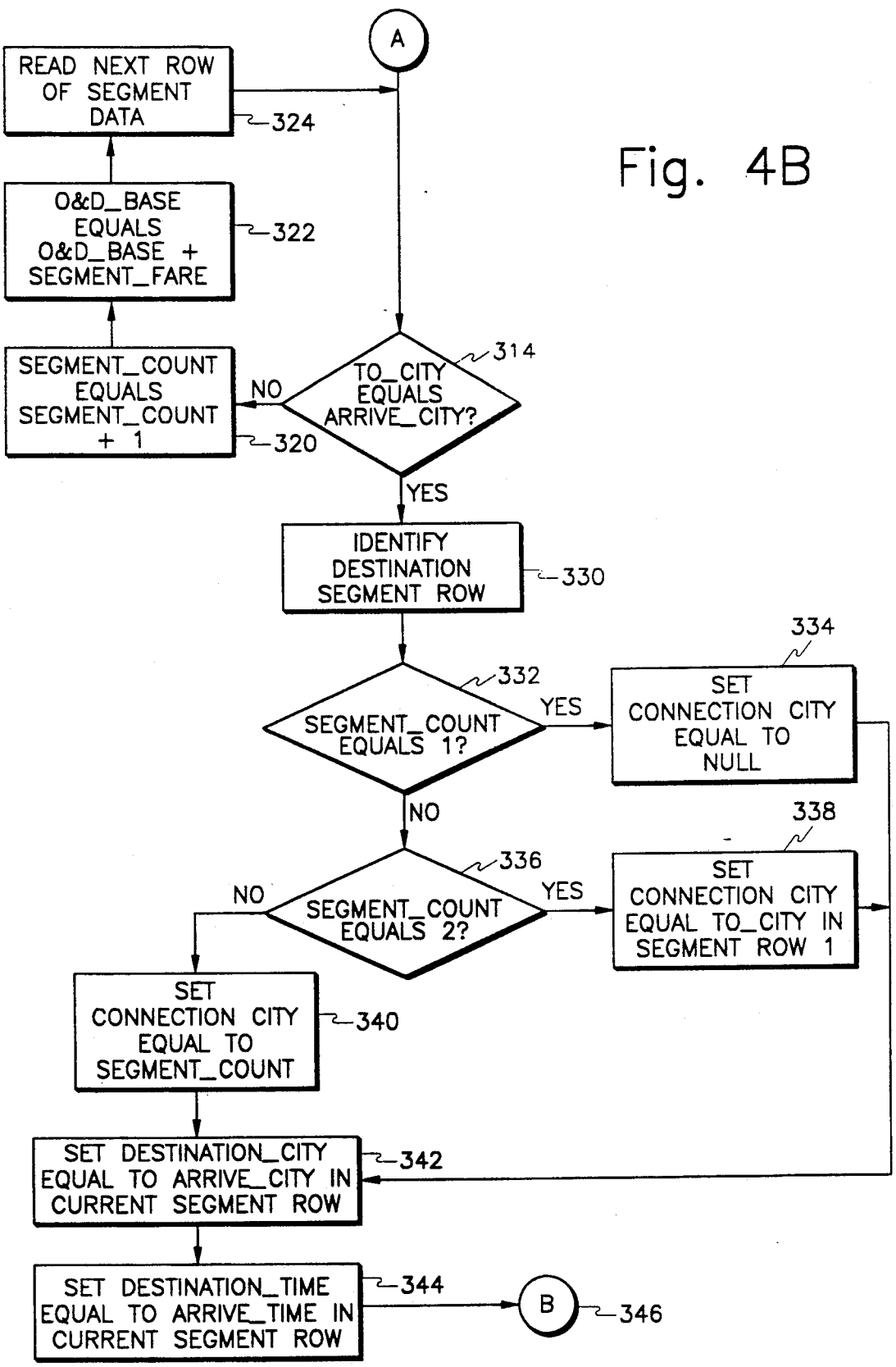

Turning now to FIG. 4, the steps 204 and 206 of FIG. 3 are described in greater detail. Following startup, data retrieval, and initialization of the process in steps 200, 202, the program instruction set 20 includes the steps of beginning data analysis at START step 300. The number of flight segments for each origin and destination is counted to produce a "Segment Count"; the segment count is set to 1 in step 302. This process identifies the origin row and the destination row of data; the steps of identifying these rows may vary among reservation systems. The process illustrated in FIG. 4 analyzes data in one common format. The precise method steps or identifying the origin and destination rows may vary among reservation systems and in a given system over time. The method disclosed herein is thus to be viewed as illustrative and not specifically limiting of the appended claims.

The "O&D" Base, which is used to sum the cost of the segment flights, is set to 0, step 304. The program instruction set 20 directs the programmable computer 14 to read the first row of segment data (i.e., segment one) at step 306. The flight "Origin City" is set equal to the "Depart City" code found in segment one at step 308. The "Origin Time" is set equal to the "Depart Time" in segment one at step 310. The "Fare Code" is set equal to the Fare Base Code found in segment one at step 312. The programmable computer 14 then compares the destination city with the arrival city in a test to determine whether the "To City" equals the "Arrive City," step 314. In block 314, FIG. 4, the arrival of one flight and departure of a subsequent flight can be analyzed to determine if a connecting flight or a layover is represented. This is described more clearly in FIG. 6BB–6BH. This analysis is facilitated by adjustment for changes from travel through successive time zone changes, variations in local time zones, including Daylight Savings/Standard Time, and/or such time system changes as occur during the travel period. See FIG. 6BB et seq. and the discussion of FIG. 5, blocks 370 and 372. Returning to FIG 6BH, the elapsed time in hours and minutes is calculated, then ordinary time zone differences are included, and adjustments are made as required. If the result of this test at step 314 is false, the segment one row of data does not contain information about the passenger's final destination. The programmable instruction set then initiates a loop consisting of steps 320, 322 and 324. The "Segment Count" is incremented by a count of one (1) at step 320. The "O&D Base" is incremented by adding the "Segment Fare" at step 322. The programmable computer 14 then retrieves and reads the next row of segment data at step 324 under program instruction set 20 control and again compares the destination city with the arrival city in a repeat of the test if the "To City" equals the "Arrive City" at step 314.

When the result of the step 314 test is true, step 330 will identify the row that contains accurate information about the trip destination, and the program instruction set will advance to the next step. A unique name or identification tag is next determined for the true Origin and Destination data associated with the trip and assigned to that block of data. This block of data may now be represented as a single row of information. The "Segment Count" is compared with the number 1 in step 332. If the "Segment Count" equals one (1) in step 332, the "Connection City" is set to null (0) in step 334; there was no connecting flight. If the test result is false, the "Segment Count" is incremented by 1 and the test is repeated to test if the "Segment Count" equals two (2) at step 336. If the result of this test is true, then there was one connection. The program sets the "Connection" count equal to the "To City" in segment row one (1) in step 338. If the result of the test is false, then the passenger incurred more than one connection stop. The "Connection" count is then set equal to the "Segment Count" minus one (1) in step 340 to indicate the number of stops made by the passenger. Next, the "Destination" is set equal to the "Arrive City" for the current segment row at step 342. "Destination Time" is set equal to the "Arrive Time" in the current row at step 344.

Returning now to FIG. 3 at step 204, the source data required for generation of secondary data at the completion of step 204 has been read and analyzed. Secondary data is defined here as that data which must be inferred from the analyzed O&D trip data since this information is not available in the reservation system database 12. This secondary data is also referred to as "true origination and destination travel data" herein.

Figure 5A:
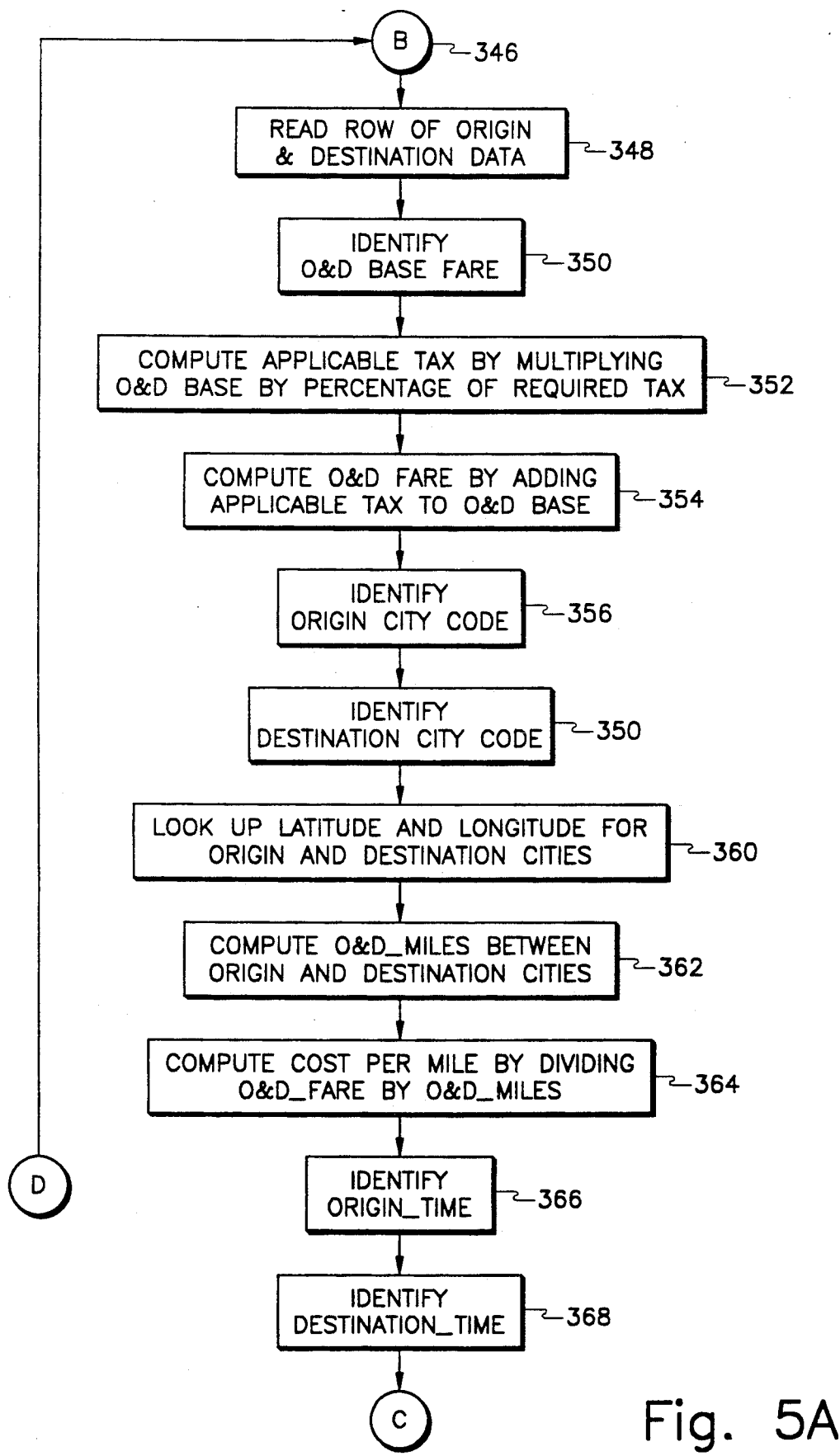
FIG. 5 is another simplified flow chart illustrating further portions of the analysis procedure.
Figure 5B:
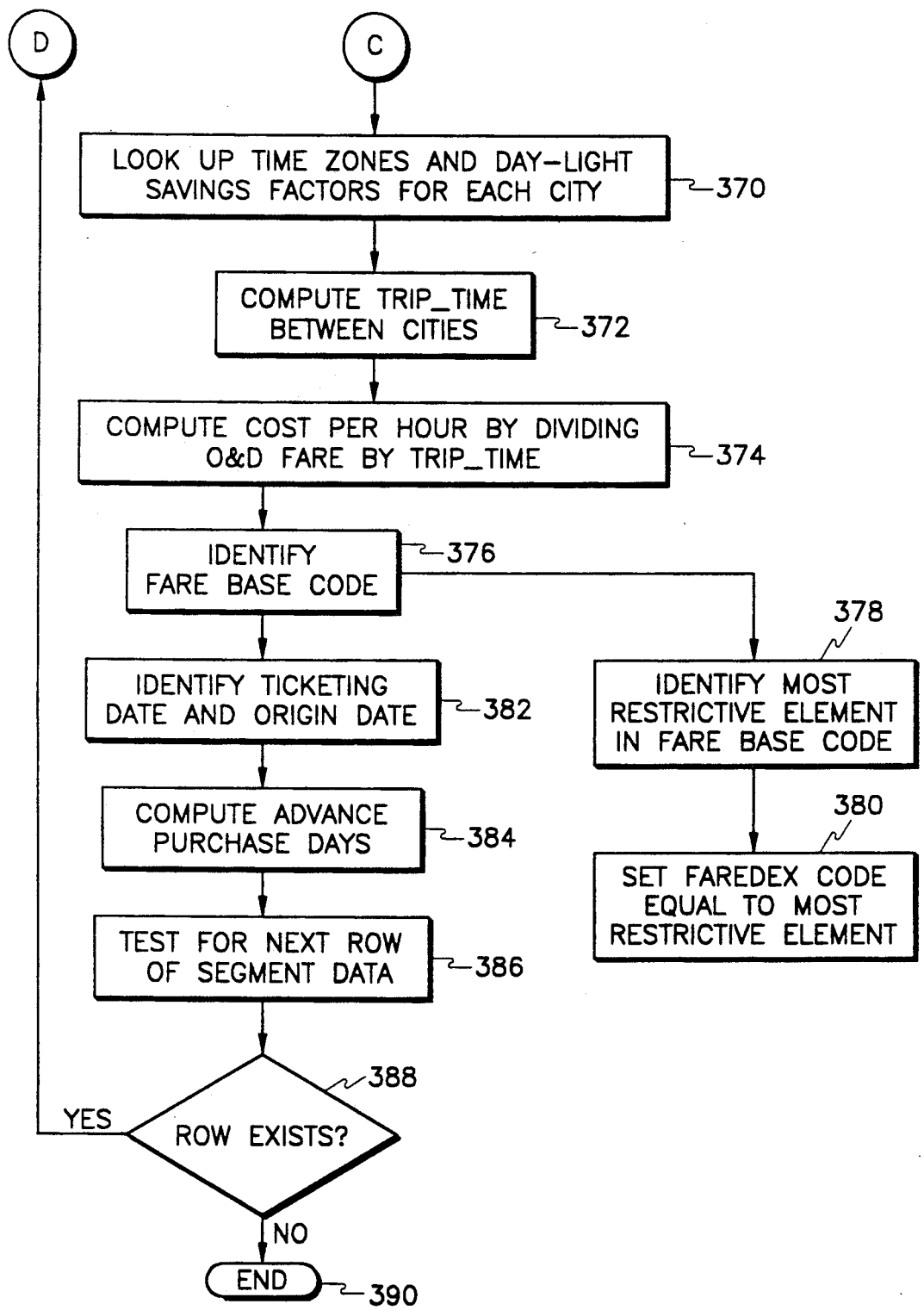

The processing of the O&D data at step 206 of FIG. 3 is set out in greater detail in FIG. 5. The flow chart of FIG. 5 is a continuation of the flow chart diagram of FIG. 4. The program instruction set 20 directs the programmable computer 14 to identify a row of true O&D data associated with the desired trip being analyzed at step 348.

Among the information usually found most useful is cost information, which can be derived from segment fare data stored in the reservation system database 12 data storage units 42, 44, 46.

The O&D Base Fare is identified in step 350, which base fare is the sum of segment fares of FIG. 3, steps 312, 314, 320, 322, 324. Under control of the program instruction set 20, the programmable computer 14 next calculates the applicable tax by multiplying the "O&D Base Fare" by the percentage of the required tax in step 352. The "Applicable Tax" is then added to the "O&D Base Fare" to derive the full "O&D Fare" at step 354.

Next, the "Origin City" and the "Destination City" codes are identified by reference to the local data storage 34 in steps 356 and 358. The respective latitude and longitude for the "Origin City" and the "Destination City" are identified by reference to the local data storage 34 in step 360. Based upon these respective latitude and longitude coordinates, the direct, or Great Circle flight distance is calculated in a convenient distance unit, such as miles or kilometers, for the distance between the "Origin City" and "Destination City," step 362. The result of this calculation is stored as "O&D Miles" in local data storage 34. The "Cost Per Mile" is then calculated in programmable computer 14 under control by the program instruction set 20, by dividing the "O&D Fare" by the "O&D Miles," step 364.

The "Origin Time" and the "Destination Time" are identified in steps 366, 368, respectively. These items must be converted to a common reference as the travel route may well extend beyond a single international time zone, and certain trips may extend in duration through a change from Daylight Savings time to Standard time, and vice-versa. Thus, the time zone and daylight savings time factors for the "Origin City" and the "Destination City" are identified from the local data storage 34 at step 370 and the trip time between the two cities is calculated in step 372, based upon time zone and daylight savings factor and the departure and arrival times. The result of this calculation is stored as the "Trip Time." Trip "Cost Per Hour" is calculated by dividing the "O&D Fare, by the "Trip Time" in step 374.

Turning now to FIG. 8, there is shown a subroutine for correcting the origin-to-destination fare, at the step represented by block 363, in generating a true origin-to-destination fare amount. The fares are processed so that the sum of the fares always equals the total invoice amount. See FIG. 6AP-AQ. From block 362 (FIG. 5), the O&D Amount is compared with a segment fare value of zero, block 365 (FIG. 8).

"IF (SUM_OD_FARE .GT INV_AMT) THEN . . . " (see FIGS. 6AP-AQ);

and in block 375 (FIG. 8):

"ELSE IF (ZERO_FARES .EQ 0) THEN . . . " (see FIGS. 6AP-AQ); and where the O&D amount exceeds the invoice amount or is less than a minimum amount, a further comparison takes place in block 369. When there is more than one O&D zero fare segment and the itinerary does not equal zero, the subroutine proceeds to block 367;

"ELSE IF (ZERO_FARES .EQ 1) THEN . . . " (see FIGS. 6AP-AQ);

and if the itinerary equals zero then the subroutine proceeds to block 371:

"ELSE" (see FIGS. 6AP-AQ);

At block 367, where only one of the segment fares is zero, the subroutine locates it and makes it equal to the amount missing, e.g., "subtract sum of O&D's from itinerary amount to compute missing amount".

Alternatively, where several segments reflect zero fare amounts, block 371, the total cost per mile from block 364 (FIG. 5) is used to allocate the difference between O&D's by the miles. That is, for each zero fare segment, the total cost per mile for the missing fare miles is used to calculate the individual O&D segment fare. The corrected origin-to-destination fare is output at 373.

Fare codes are common in the travel industry. Airline fare base codes, for example, are comprised of accepted industry abbreviations. These codes can be expected to vary with time and initially, among air carriers. The "Fare Base Code" is identified in step 376. The fare base code is assessed to determine the most restrictive fare rule that applies to the fare for the particular trip, step 378. For convenience in handling the true origin to destination data, equivalents of similar standard codes in current use may be produced and applied. The codes used in the present invention have been produced by Prism Group, Inc., Laurel, Md., and are called herein "FareDex" codes. These codes are the property of Prism Group, Inc. and are presented here for illustrative purposes only and are not to be viewed as limiting of the appended claims as other equivalent codes and code systems may also be used herein. Based upon the most restrictive fare rule identified in step 378, the FareDex code equal to the most restrictive rule in the "Fare Base Code" is set in step 380. FareDex codes change over time; examples of some FareDex codes are:

| FAREDEX TRANSLATION TABLE | | | |
|---|---|---|---|
| CATEGORY | FARE-TYPE | FARE BASIS EXAMPLES | FAREDEX CODE |
| Full Fare | First Class | F, Y | First |
|  | Business Class | C, J | Business |
|  | Coach | Y, Y9, Y29 | Coach |
| Negotiated Fares | Government | DG | NGov |
|  | Military | MM | NMil |
| Round Trip | No Restrictions | R | RT |
|  | Excursion | E | RTR |
| Advance Purchase | 3-30 Day Advance | A, AP | AP (3-30) |
| Restricted Discounts | Airport | JFK, DCA, IAD | DAIR |
|  | Passenger | VUSA | DPAX |
|  | Flight | FLT | DFLT |
|  | Weekday | X | DDAY |

FAREDEX TRANSLATION TABLE -continued

| CATEGORY | FARE-TYPE | FARE BASIS EXAMPLES | FAREDEX CODE |
|---|---|---|---|
| | Weekend | W | DEND |
| | Peak | PEAK, PK, H | DHI |
| | Off-Peak | DOFF, L | DLOW |
| | Controlled | M, Q, H, Z | DCAP |

The "Ticketing Date" and the "Origin Date" are identified in step 382, enabling computation of the number of days between the "Ticketing Date" and the "Origin Date" to determine the number of "Advance Purchase" days, step 382.

At this stage, most of the information usually desired but not available from the available segment data has been extracted; however, additional information may be calculated with additional input, as for example, an executive's valuable time may be calculated in the cost per hour, or cost per mile calculations when the executive's salary is input by &.he operator.

Under control of the program instruction set 20, the programmable computer may be directed to repeat the procedure. If this is the case, a determination is made to determine if there is another row of O&D data at step 386. If another row of O&D data is present to be analyzed and processed, the test result is true 388, and the procedure is returned to step 300 of FIG. 4 to begin the procedure again. If no further O&D data is present, the test result is false and the procedure ends, 300.

A detailed, annotated listing of representative code illustrating one form of the program instruction set 20 with which the present invention is carried out is presented in FIG. 6. The program code listing is representative; applicant thus claims equivalent code in other program languages within the scope of the appended claims.

Four example trips, illustrated in FIGS. 7a and 7b, are described in the following cases:

Case 1

Reservation Data—Case one incorporates two non-stop segments; each segment has the complete data for the origin and destination of the flight in one row of data. The only data missing from Row 2 in this example is the passenger's name and the carrier (the carrier is shown in Row 1).

O&D Data—The O&D analyzer system 10 first enters the passenger's name and invoice number for Row 2, enabling determination of the exact flights flown by each passenger. The O&D analyzer 10 then calculates the following derived information: segment amount with tax, miles flown, cost per mile, trip time (expressed as hours and minutes), cost per hour, a translation of the fare basis code to a FareDex code, and the number of days the ticket was purchased in advance of departure.

Case 2

Reservation Data—Case two comprises one connecting flight. The origin is Newark (EWR) with one connecting stop in Chicago (ORD), continuing on to a final destination in Portland (PDX). The segment amount shown in Row 1 is 0.00 because the passenger has purchased a flight to Portland, not to Chicago. Row 2 shows the actual flight fare amount but only the second segment flight information. The price reflects the complete trip, not just the Chicago to Portland segment.

O&D Data—The O&D analyzer system 10 identifies that the To_City in Row 1 is not the destination city. By comparing the To-City in Row 1 with the From_City in Row 2 and the time between connections, the analyzer system determines that the flight is a connecting flight. A new row of data is written indicating that the trip is from EWR to ORD to PDX, and that the trip includes two segments. It then calculates the actual fare with tax, the distance from EWR to PDX in miles, the cost per mile, the trip time between EWR and PDX, the cost per hour for the trip, a translation of the fare base code, and the number of ticket advance purchase days.

Case 3

Reservation Data—Case 3 depicts a round trip on flights with different connecting carriers. While the trip actually included only two destinations, Newark to Phoenix and Phoenix to Newark, the data shows four flight segments.

O&D Data—The O&D Analyzer 10 rewrites the four flight segments into two origin and destination rows. Row 1 depicts the connection in Washington, D.C. at Dulles Airport: EWR IAH PHX. Row 2 shows the return flight connection to Denver: PHX DEN EWR. Additional information for each origin and destination is written for each row as is described in Case 1 and Case 2, above.

Case 4

Reservations Data—Case four shows a trip including two connecting flights to Phoenix and a return trip on one connecting flight to Newark. Although the trip includes only two destinations, the reservation format displays five rows of data.

O&D Data—Two connections are required to the first destination en route to Phoenix. The O&D analyzer 10 rewrites these three rows of data as one row with the following route: EWR 2 PHX; thus distinguishing the first trip from other trips making only one stop. The second flight including two segments is written as one origin and destination row with the route: PHX DEN LGA. Additional O&D data is then written for each row as is described in Case 1 and Case 2, above.

Having described an exemplary embodiment of the invention, it will be appreciated that various alterations, modifications, and improvements, though not expressly described hereinbefore, are nevertheless intended to be included within the scope and spirit of the invention. Accordingly, the foregoing discussion is intended to be illustrative only, and not limiting; the invention is limited only by the following claims and the equivalents thereof.

What is claimed is:

1. A system for after-ticket purchase determination of true origin-to-destination travel data inferred from travel segment data stored in a computer-based travel reservation database system, comprising:
   (a) means for accessing the computer-based travel reservation database after purchase of a ticket;
   (b) means for selectively retrieving via said accessing means travel segment data from said computer-based travel reservation database system;
   (c) a machine-readable program instruction set;
   (d) a programmable computer in communication with said travel reservation database, responsive to an input origin-to-destination inquiry, including:

(i) a processor operating according to said program instruction set;

(iii) means for producing a unique origin-to-destination data block representing a plurality of said data segments including means for processing each identified travel segment data set to produce a true origin-to-destination data block under the control of said program instruction set;

(iii) means for producing a unique name and assigning said unique origin-to-destination data block therewith under the control of said program instruction set, wherein said true origin-to-destination data block includes a group of characters in human readable form;

(e) terminal means for inputting selected raw origin-to-destination travel data into said processor; and (f) means for outputting from said processor a group of characters forming information in human readable form.

2. The system of claim 1, wherein said programmable computer, under the control of said instruction set, further comprises means for accumulating a total of the travel segments included in a true origin-to-destination data block.

3. The system of claim 1, wherein said programmable computer, under the control of said instruction set, further comprises means for calculating an origin-to-destination fare for the travel segments which comprise said data block.

4. The system of claim 3, wherein said programmable computer, under the control of said instruction set, further comprises means for correction of segment fare data forming the true origin-to-destination data block.

5. The system of claim 3, wherein said programmable computer, under the control of said instruction set, further comprises means for correction of segment travel time forming the true origin-to-destination data block.

6. The system of claim 1, wherein said programmable computer, under the control of said instruction set, further comprises means for calculating an origin-to-destination distance for the travel segments which comprise said data block.

7. The system of claim 1, wherein said programmable computer, under the control of said instruction set, further comprises means for calculating an origin-to-destination trip time for the travel segments which comprise said data block.

8. The system of claim 1, wherein said programmable computer, under the control of said instruction set, further comprises means for calculating an origin-to-destination cost per mile for the travel segments which comprise said data block.

9. The system of claim 1, wherein said programmable computer, under the control of said instruction set, further comprises means for calculating an origin-to-destination cost per unit of trip time for the travel segments which comprise said data block.

10. The system of claim 1, wherein said programmable computer under the control of said instruction set, further comprises means for determining a fare base according to a standard fare code for the travel segments which comprise said data block.

11. The system of claim 1, wherein said programmable computer, under the control of said instruction set, further comprises means for determining a FareDex code for the travel segments which comprise said data block.

12. The system of claim 1, wherein said true origin-to-destination data block nd said unique name form a single line of data.

13. The system of claim 1, wherein said programmable computer, under the control of said instruction set, further comprises means for identifying as a layover a period greater than four hours between travel segments forming the true origin-to-destination data block.

14. The system of claim 1, wherein said programmable computer, under the control of said instruction set, further comprises means for identifying as a connecting flight a period less than four hours between travel segments forming the true origin-to-destination data block.

15. The system of claim 1, wherein said programmable computer, under the control of said instruction set, further comprises means for correcting segment travel time for local changes in the time zones in forming the true origin-to-destination data block.

16. In a travel information system including a programmable computer operating according to an accompanying program instruction set, the post transaction method of determining true origin-to-destination travel data from travel segment information stored as travel segment data in a computer-based travel reservation database system, comprising operating said computer according to the steps of:

(a) accessing said computer-based travel reservation database under program instruction set control;

(b) selectively retrieving from said travel reservation database system travel segment data from said computer-based travel database system under program instruction set control after purchase of a ticket;

(c) inputting selected origin-to-destination travel data into said processor;

(d) generating under program instruction set control a unique origin-to-destination data block including said travel data segments representing said origin-to-destination travel data;

(e) producing a unique name and associating said unique origin-to-destination data block therewith under program instruction set control; and (f) outputting from said programmable computer the origin-to-destination information in human readable form.

17. The method of claim 16, wherein step (d) further comprises: associating individual travel segment data and computing an origin-to-destination fare for the travel segments which comprise said data block under program instruction set control.

18. The method of claim 17, further including the step of correcting segment fare data forming the true origin-to-destination data block under the control of said instruction set.

19. The method of claim 17, further including the step of correcting segment travel time forming the true origin-to-destination data block under the control of said instruction set.

20. The method of claim 16, wherein step (d) further comprises: associating individual travel segment data and computing an origin-to-destination distance for the travel segments which comprise said data block under program instruction set control.

21. The method of claim 16, wherein step (d) further comprises: associating individual segment data and computing an origin-to-destination travel time for the travel segments which comprise said data block under program instruction set control.

22. The method of claim 16, wherein step (d) further comprises: associating individual travel segment data and computing a total origin-to-destination trip time for the travel segments which comprise said data block under program instruction set control.

23. The method of claim 16, wherein step (d) further comprises: associating individual segment data and computing an actual origin-to-destination travel cost per mile for the travel segments which comprise said data block under program instruction set control.

24. The method of claim 16, wherein step (d) further comprises: associating individual segment data and computing an actual origin-to-destination cost per unit of travel time for the travel segments which comprise said data block under program instruction set control.

25. The method of claim 16, wherein said true origin-to-destination data block and said unique name are formed into a single line of data.

26. The method of claim 16, further including the step of identifying as a layover a period greater than four hours between travel segments forming the true origin-to-destination data block under the control of said instruction set.

27. The method of claim 16, further including the step of identifying as a connecting flight a period less than four hours between travel segments forming the true origin-to-destination data block under the control of said instruction set.

28. The method of claim 16, further including the step of correcting segment travel time for local changes in the time zones in forming the true origin-to-destination data block under the control of said instruction set.

29. A system for after-ticket purchase determination of true origin-to-destination travel data inferred from travel segment data stored in a computer-based information storage system, comprising:
(a) means for accessing the computer-based information storage system after purchase of a ticket;
(b) means for selectively retrieving via said accessing means travel segment data from said computer-based information storage system;
(c) a machine-readable program instruction set;
(d) a programmable computer in communication with said computer-based information storage system, responsive to an origin-to-destination inquiry, including:
  (i) a processor operating according to said program instruction set;
  (ii) means for producing a unique origin-to-destination data block representing a plurality of said data segments including means for processing each identified travel segment data set to produce a true origin-to-destination data block under the control of said program instruction set;
  (iii) means for producing a unique name and associating said unique origin-to-destination data block therewith under control of said program instruction set, wherein said true origin-to-destination data block includes a group of characters in human readable form;
(e) terminal means for inputting selected raw origin-to-destination travel data into said processor;
(f) means for outputting from said processor a group of characters forming information in human readable form; and
(g) a local data storage unit.

30. The system of claim 29, wherein said programmable computer, under the control of said instruction set, further comprises means for accumulating a total of the travel segments included in a true origin-to-destination data block.

31. The system of claim 29, wherein said programmable computer, under the control of said instruction set, further comprises means for calculating an origin-to-destination fare for the travel segments which comprise said data block.

32. The system of claim 31, wherein said programmable computer, under the control of said instruction set, further comprises means for correction of segment fare data forming the true origin-to-destination data block.

33. The system of claim 31, wherein said programmable computer, under the control of said instruction set, further comprises means for correction of segment travel time forming the true origin-to-destination data block.

34. The system of claim 29, wherein said local data storage unit includes the respective longitude and latitude locations of a plurality of airports and said programmable computer, under the control of said instruction set, further comprises means for calculating for the travel segments which comprise said data block an origin-to-destination Great Circle distance by reference to said longitude and latitude information stored in said local storage unit.

35. The system of claim 34, wherein said programmable computer, under the control of said instruction set, further comprises means for calculating an origin-to-destination cost per unit of distance for the travel segments which comprise said data block.

36. The system of claim 29, wherein said programmable computer, under the control of said instruction set, further comprises means for calculating an origin-to-destination trip time for the travel segments which comprise said data block.

37. The system of claim 29, wherein said programmable computer, under the control of said instruction set, further comprises means for calculating an origin-to-destination cost per unit of trip time for the travel segments which comprise said data block.

38. The system of claim 29, wherein said local data storage unit includes standard fare codes and said programmable computer, under the control of said instruction set, further comprises means for determining a fare base according to a standard fare code for the travel segments which comprise said data block.

39. The system of claim 38, wherein said programmable computer, under the control of said instruction set, further comprises means for determining a FareDex code for the travel segments which comprise said data block.

40. The system of claim 29, wherein said true origin-to-destination data block and said unique name form a single line of data.

41. The system of claim 29, wherein said programmable computer, under the control of said instruction set, further comprises means for identifying as a layover a period greater than four hours between travel segments forming the true origin-to-destination data block.

42. The system of claim 29, wherein said programmable computer, under the control of said instruction set, further comprises means for identifying as a connecting flight a period less than four hours between travel segments forming the true origin-to-destination data block.

43. The system of claim 29, wherein said programmable computer, under the control of said instruction set, further comprises means for correcting segment travel time for local changes in the time zones in forming the true origin-to-destination data block.

44. The method for after-ticket purchase determination of true origin-to-destination travel data from travel segment data stored in a computer-based information storage system having a processor operating according to an accompanying program instruction set, comprising operating said computer according to the steps of:
   a) inputting selected origin-to-destination travel data into said processor;
   b) selectively retrieving from said information storage system travel segment data after purchase of a ticket;
   c) generating under program instruction set control a unique origin-to-destination data block including said travel segment data representing said origin-to-destination travel data;
   d) producing a unique name and associating said unique origin-to-destination data block therewith to produce a single line data display under program instruction set control; and
   outputting from said programmable computer said single line data display in human readable form.

45. The method of claim 44 wherein said processor controls steps (b), (c), and (d) in response to step (a) and to said program instruction set.

46. The method of claim 44, wherein step (c) further comprises: associating individual travel segment data and computing an origin-to-destination fare for the travel segments which comprise said data block under program instruction set control.

47. The method of claim 46, further including the step of correcting segment fare data forming the true origin-to-destination data block under the control of said instruction set.

48. The method of claim 46, further including the step of correcting segment travel time forming the true origin-to-destination data block under the control of said instruction set.

49. The method of claim 44, wherein step (c) further comprises: associating individual travel segment data and computing an actual origin-to-destination travel distance for the travel segments which comprise said data block under program instruction set control.

50. The method of claim 44, wherein step (c) further comprises: associating individual travel segment data and computing an actual origin-to-destination travel time for the travel segments which comprise said data block under program instruction set control.

51. The method of claim 44, wherein step (c) further comprises: associating individual travel segment data and computing an actual origin-to-destination travel time for the travel segments which comprise said data block under program instruction set control.

52. The method of claim 44, wherein step (c) further comprises: associating individual travel segment data and computing an actual origin-to-destination travel cost per mile for the travel segments which comprise said data block under program instruction set control.

53. The method of claim 44, wherein step (c) further comprises: associating individual travel segment data and computing an actual origin-to-destination cost per unit of trip time for the travel segments which comprise said data block under program instruction set control.

54. The method of claim 44, further including the step of identifying as a layover a period greater than four hours between travel segments forming the true origin-to-destination data block under the control of said instruction set.

55. The method of claim 44, further including the step of identifying as a connecting flight a period less than four hours between travel segments forming the true origin-to-destination data block under the control of said instruction set.

56. The method of claim 44, further including the step of correcting segment travel time for local changes in the time zones in forming the true origin-to-destination data block under the control of said instruction set.

* * * * *